(12) United States Patent
Terashima

(10) Patent No.: US 8,782,484 B2
(45) Date of Patent: Jul. 15, 2014

(54) METHOD, PROGRAM AND DEVICE TO ADD AN ERROR CORRECTION CODE TO A TRANSMISSION SIGNAL

(75) Inventor: Toru Terashima, Kanagawa (JP)

(73) Assignee: Sony Corporation (JP)

( * ) Notice: Subject to any disclaimer, the term of this patent is extended or adjusted under 35 U.S.C. 154(b) by 612 days.

(21) Appl. No.: 13/065,558

(22) Filed: Mar. 24, 2011

(65) Prior Publication Data

US 2011/0246851 A1    Oct. 6, 2011

(30) Foreign Application Priority Data

Mar. 31, 2010 (JP) .................. P2010-080514

(51) Int. Cl.
*H03M 13/00* (2006.01)
(52) U.S. Cl.
USPC .......................................... 714/752; 714/755
(58) Field of Classification Search
None
See application file for complete search history.

(56) References Cited

U.S. PATENT DOCUMENTS

| | | | |
|---|---|---|---|
| 6,995,694 B1 * | 2/2006 | He et al. ..................... | 341/58 |
| 7,683,810 B2 * | 3/2010 | Tsang ........................ | 341/59 |
| 2007/0043898 A1 * | 2/2007 | Ozeki et al. ................ | 711/100 |

FOREIGN PATENT DOCUMENTS

| | | |
|---|---|---|
| JP | 03-109843 A | 5/1991 |
| JP | 2009-250804 A | 10/2009 |
| JP | 2010-008454 A | 1/2010 |

OTHER PUBLICATIONS

U.S. Appl. No. 12/909,604.

* cited by examiner

*Primary Examiner* — Albert Decady
*Assistant Examiner* — Justin R Knapp
(74) *Attorney, Agent, or Firm* — Lerner, David, Littenberg, Krumholz & Mentlik, Ltd.

(57) ABSTRACT

A transmission device includes a first conversion unit converting first transmission target data into first transmission data formed by N symbol values, with predetermined units of data, based on a first conversion table, a second conversion unit converting first error correction data into first symbol data formed by the a symbol values, based on a second conversion table, a third conversion unit converting second transmission target data into second symbol data formed by the (N-a) symbol values, based on a third conversion table, an addition and generation unit adding the second symbol data to the first symbol data and generating second transmission data formed by the N symbol values, and a transmission unit transmitting a transmission signal formed by the first and second transmission data.

9 Claims, 25 Drawing Sheets

FIG. 5

| TABLE A (14B8Q) | | | | | | | | | |
|---|---|---|---|---|---|---|---|---|---|
| 00000 | -2 | -1 | 1 | 2 | 10000 | -1 | 0 | 1 | 0 |
| 00001 | -2 | -1 | 2 | 1 | 10001 | -1 | 0 | 2 | -1 |
| 00010 | -2 | 0 | 0 | 2 | 10010 | -1 | 1 | -2 | 2 |
| 00011 | -2 | 0 | 2 | 0 | 10011 | -1 | 1 | -1 | 1 |
| 00100 | -2 | 1 | -1 | 2 | 10100 | -1 | 1 | 1 | -1 |
| 00101 | -2 | 1 | 0 | 1 | 10101 | -1 | 1 | 2 | -2 |
| 00110 | -2 | 1 | 1 | 0 | 10110 | -1 | 2 | -2 | 1 |
| 00111 | -2 | 1 | 2 | -1 | 10111 | -1 | 2 | -1 | 0 |
| 01000 | -2 | 2 | -2 | 2 | 11000 | -1 | 2 | 0 | -1 |
| 01001 | -2 | 2 | -1 | 1 | 11001 | -1 | 2 | 1 | -2 |
| 01010 | -2 | 2 | 1 | -1 | 11010 | 0 | -2 | 0 | 2 |
| 01011 | -2 | 2 | 2 | -2 | 11011 | 0 | -2 | 2 | 0 |
| 01100 | -1 | -2 | 1 | 2 | 11100 | 0 | -1 | -1 | 2 |
| 01101 | -1 | -2 | 2 | 1 | 11101 | 0 | -1 | 0 | 1 |
| 01110 | -1 | 0 | -1 | 2 | 11110 | 0 | -1 | 1 | 0 |
| 01111 | -1 | 0 | 0 | 1 | 11111 | 0 | -1 | 2 | -1 |

FIG. 6

| TABLE B (14B8Q) | | | | | | | | | |
|---|---|---|---|---|---|---|---|---|---|
| 00000 | -2 | 0 | 1 | 2 | 10000 | -1 | 2 | -1 | 1 |
| 00001 | -2 | 0 | 2 | 1 | 10001 | 0 | -2 | 1 | 2 |
| 00010 | -2 | 1 | 0 | 2 | 10010 | 0 | -2 | 2 | 1 |
| 00011 | -2 | 1 | 2 | 0 | 10011 | 0 | -1 | 0 | 2 |
| 00100 | -2 | 2 | -1 | 2 | 10100 | 0 | -1 | 1 | 1 |
| 00101 | -2 | 2 | 0 | 1 | 10101 | 0 | -1 | 2 | 0 |
| 00110 | -2 | 2 | 1 | 0 | 10110 | 0 | 0 | -1 | 2 |
| 00111 | -2 | 2 | 2 | -1 | 10111 | 0 | 1 | -2 | 2 |
| 01000 | -1 | 0 | 0 | 2 | 11000 | 0 | 1 | -1 | 1 |
| 01001 | -1 | 0 | 1 | 1 | 11001 | 0 | 2 | -2 | 1 |
| 01010 | -1 | 0 | 2 | 0 | 11010 | 1 | -2 | 0 | 2 |
| 01011 | -1 | 1 | -1 | 2 | 11011 | 1 | -2 | 1 | 1 |
| 01100 | -1 | 1 | 0 | 1 | 11100 | 1 | -1 | 1 | 2 |
| 01101 | -1 | 1 | 1 | 0 | 11101 | 1 | -1 | 0 | 1 |
| 01110 | -1 | 1 | 2 | -1 | 11110 | 1 | 0 | -2 | 2 |
| 01111 | -1 | 2 | -2 | 2 | 11111 | 2 | -2 | -1 | 2 |

FIG. 7

| TABLE C (14B8Q) | | | | |
|---|---|---|---|---|
| 0000 | −1 | 0 | 1 | 2 |
| 0001 | −1 | 0 | 2 | 1 |
| 0010 | −1 | 1 | 0 | 2 |
| 0011 | −1 | 1 | 2 | 0 |
| 0100 | −1 | 2 | −1 | 2 |
| 0101 | −1 | 2 | 0 | 1 |
| 0110 | −1 | 2 | 1 | 0 |
| 0111 | 0 | −1 | 1 | 2 |
| 1000 | 0 | −1 | 2 | 1 |
| 1001 | 0 | 1 | −1 | 2 |
| 1010 | 0 | 2 | −2 | 2 |
| 1011 | 0 | 2 | −1 | 1 |
| 1100 | 1 | −2 | 1 | 2 |
| 1101 | 1 | −2 | 2 | 1 |
| 1110 | 1 | −2 | 0 | 2 |
| 1111 | 1 | 0 | −1 | 2 |

FIG. 8

| TABLE D (14B8Q) | | | | |
|---|---|---|---|---|
| 0000 | −2 | 2 | 1 | 2 |
| 0001 | −2 | 2 | 2 | 1 |
| 0010 | −1 | 1 | 2 | 2 |
| 0011 | −1 | 1 | 1 | 1 |
| 0100 | −1 | 2 | 0 | 2 |
| 0101 | −1 | 2 | 1 | 1 |
| 0110 | −1 | 2 | 2 | 0 |
| 0111 | 0 | −1 | 2 | 2 |
| 1000 | 0 | 2 | −1 | 2 |
| 1001 | 1 | −2 | 2 | 2 |
| 1010 | 1 | −1 | 1 | 2 |
| 1011 | 1 | −1 | 2 | 1 |
| 1100 | 1 | 1 | −1 | 2 |
| 1101 | 1 | 2 | −2 | 2 |
| 1110 | 2 | −2 | 1 | 2 |
| 1111 | 2 | −1 | 0 | 2 |

FIG. 12

| SYMBOL VALUE | BINARY VALUE FOR FEC OPERATION |
|---|---|
| 2 | 11 |
| 1 | 01 |
| 0 | 00 |
| −1 | 10 |
| −2 | 11 |

FIG. 13

| 4B | 3Q | | |
|---|---|---|---|
| 0000 | −2 | 0 | 2 |
| 0001 | −2 | 2 | 0 |
| 0010 | −1 | −1 | 2 |
| 0011 | −1 | 0 | 1 |
| 0100 | −1 | 1 | 0 |
| 0101 | −1 | 2 | −1 |
| 0110 | 0 | −2 | 2 |
| 0111 | 0 | −1 | 1 |
| 1000 | 0 | 1 | −1 |
| 1001 | 0 | 2 | −2 |
| 1010 | 1 | −2 | 1 |
| 1011 | 1 | −1 | 0 |
| 1100 | 1 | 0 | −1 |
| 1101 | 1 | 1 | −2 |
| 1110 | 2 | −2 | 0 |
| 1111 | 2 | 0 | −2 |

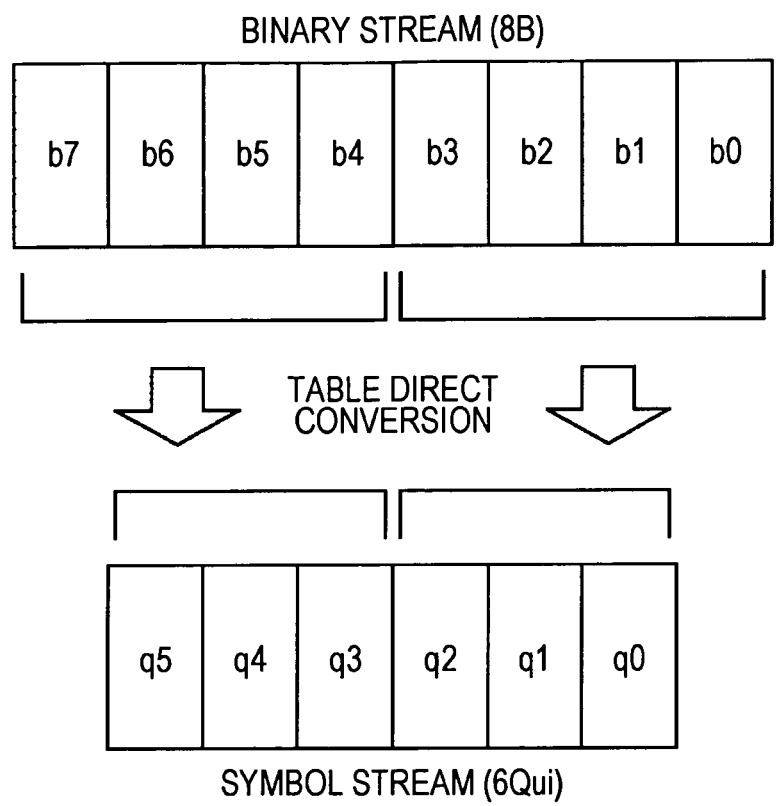

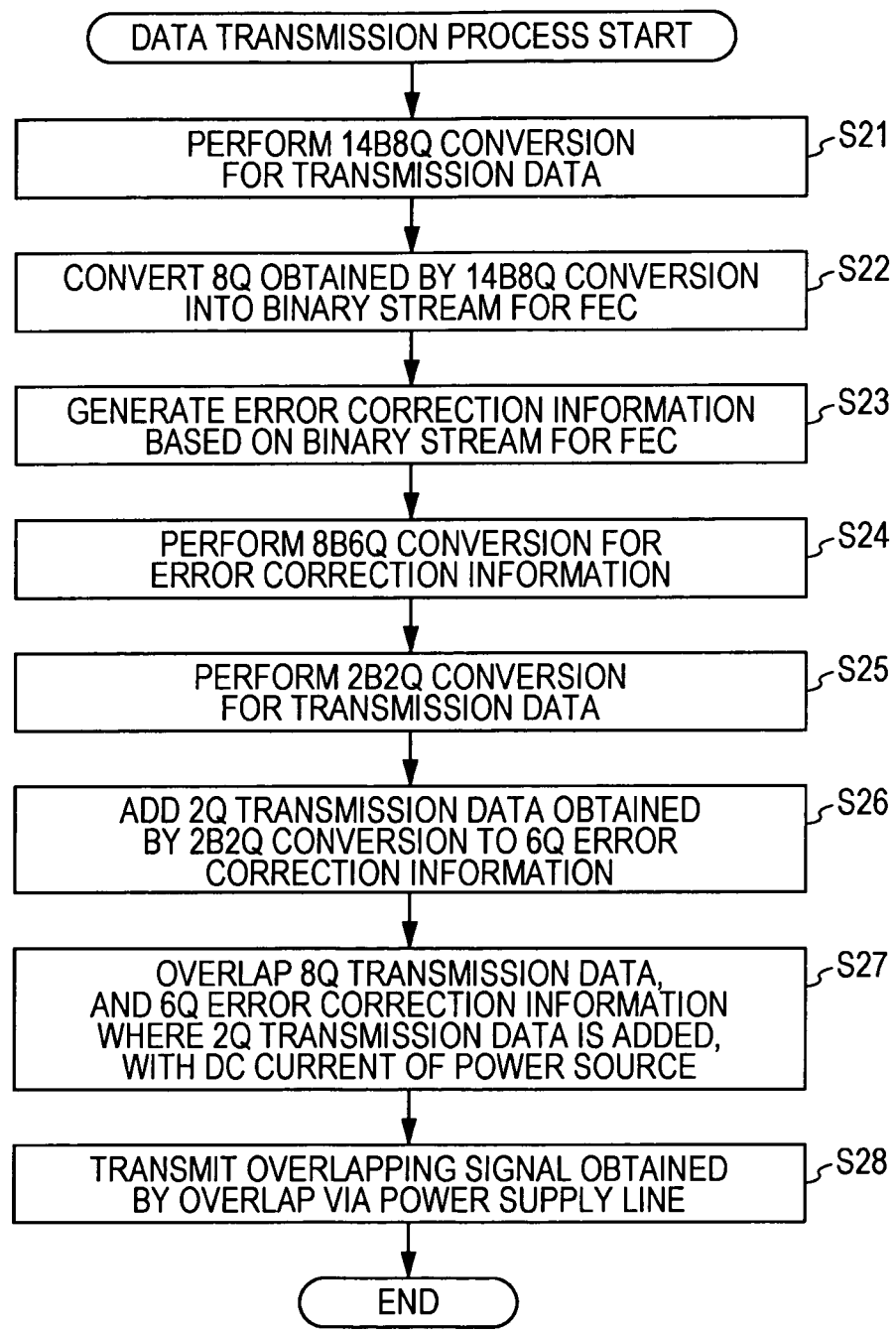

FIG. 21

| TABLE A (12B8Q) | | | | |
|---|---|---|---|---|
| 0000 | −1.5 | 0.5 | −0.5 | 1.5 |
| 0001 | −1.5 | 0.5 | 1.5 | −0.5 |
| 0010 | −1.5 | 1.5 | −1.5 | 1.5 |
| 0011 | −1.5 | 1.5 | −0.5 | 0.5 |
| 0100 | −1.5 | 1.5 | 0.5 | −0.5 |
| 0101 | −1.5 | 1.5 | 1.5 | −1.5 |
| 0110 | −0.5 | −1.5 | 0.5 | 1.5 |
| 0111 | −0.5 | −1.5 | 1.5 | 0.5 |
| 1000 | −0.5 | −0.5 | 0.5 | 0.5 |
| 1001 | −0.5 | 0.5 | −1.5 | 1.5 |
| 1010 | −0.5 | 0.5 | −0.5 | 0.5 |
| 1011 | −0.5 | 0.5 | 0.5 | −0.5 |
| 1100 | −0.5 | 0.5 | 1.5 | −1.5 |
| 1101 | −0.5 | 1.5 | −1.5 | 0.5 |
| 1110 | −0.5 | 1.5 | −0.5 | −0.5 |
| 1111 | −0.5 | 1.5 | 0.5 | −1.5 |

FIG. 22

| TABLE B (12B8Q) | | | | |
|---|---|---|---|---|
| 0000 | −1.5 | −0.5 | 1.5 | 1.5 |
| 0001 | −1.5 | 1.5 | −0.5 | 1.5 |
| 0010 | −1.5 | 1.5 | 1.5 | −0.5 |
| 0011 | −0.5 | −1.5 | 1.5 | 1.5 |
| 0100 | −0.5 | −0.5 | 0.5 | 1.5 |
| 0101 | −0.5 | −0.5 | 1.5 | 0.5 |
| 0110 | −0.5 | 0.5 | −0.5 | 1.5 |
| 0111 | −0.5 | 0.5 | 1.5 | −0.5 |
| 1000 | −0.5 | 1.5 | −1.5 | 1.5 |
| 1001 | −0.5 | 1.5 | −0.5 | 0.5 |
| 1010 | 0.5 | −1.5 | 0.5 | 1.5 |
| 1011 | 0.5 | −1.5 | 1.5 | 0.5 |
| 1100 | 0.5 | −0.5 | −0.5 | 1.5 |
| 1101 | 0.5 | −0.5 | 0.5 | 0.5 |
| 1110 | 0.5 | 0.5 | −1.5 | 1.5 |
| 1111 | 1.5 | −1.5 | −0.5 | 1.5 |

FIG. 23

| TABLE C (12B8Q) | | | | |
|---|---|---|---|---|
| 000 | −0.5 | −0.5 | 1.5 | 1.5 |
| 001 | −0.5 | 1.5 | −0.5 | 1.5 |
| 010 | 0.5 | −1.5 | 1.5 | 1.5 |
| 011 | 0.5 | −1.5 | 0.5 | 1.5 |
| 100 | 0.5 | −0.5 | 1.5 | 0.5 |
| 101 | 0.5 | 0.5 | −0.5 | 1.5 |
| 110 | 0.5 | 1.5 | −1.5 | 1.5 |
| 111 | 1.5 | −1.5 | 0.5 | 1.5 |

FIG. 24

| TABLE D (12B8Q) | | | | |
|---|---|---|---|---|
| 000 | −1.5 | 1.5 | 1.5 | 1.5 |
| 001 | −0.5 | 0.5 | 1.5 | 1.5 |
| 010 | −0.5 | 1.5 | 0.5 | 1.5 |
| 011 | −0.5 | 1.5 | 1.5 | 0.5 |
| 100 | 0.5 | −0.5 | 1.5 | 1.5 |
| 101 | 0.5 | 1.5 | −0.5 | 1.5 |
| 110 | 1.5 | −1.5 | 1.5 | 1.5 |
| 111 | 1.5 | −0.5 | 0.5 | 1.5 |

FIG. 28

| SYMBOL VALUE | BINARY VALUE FOR FEC OPERATION |
|---|---|
| 3 | 11 |
| 1 | 01 |
| −1 | 00 |
| −3 | 10 |

FIG. 29

| 3B | 3Q | | |
|---|---|---|---|
| 000 | −1 | −1 | 3 |
| 001 | −1 | 1 | 1 |
| 010 | −1 | 3 | −1 |
| 011 | 1 | −3 | 3 |
| 100 | 1 | −1 | 1 |
| 101 | 1 | 1 | −1 |
| 110 | 3 | −3 | 1 |
| 111 | 3 | −1 | −1 |

FIG. 30

| 3B | 3Q | | |
|---|---|---|---|
| 000 | −1 | 1 | 3 |
| 001 | −1 | 3 | 1 |
| 010 | 1 | −1 | 3 |
| 011 | 1 | 3 | −1 |
| 100 | 3 | −3 | 3 |
| 101 | 3 | −1 | 1 |
| 110 | 3 | 1 | −1 |
| 111 | 3 | 3 | −3 |

FIG. 32

| 2B | 2Q | |
|----|----|----|
| 00 | −3 | 3 |
| 01 | −1 | 1 |
| 10 | 1 | −1 |
| 11 | 3 | −3 |

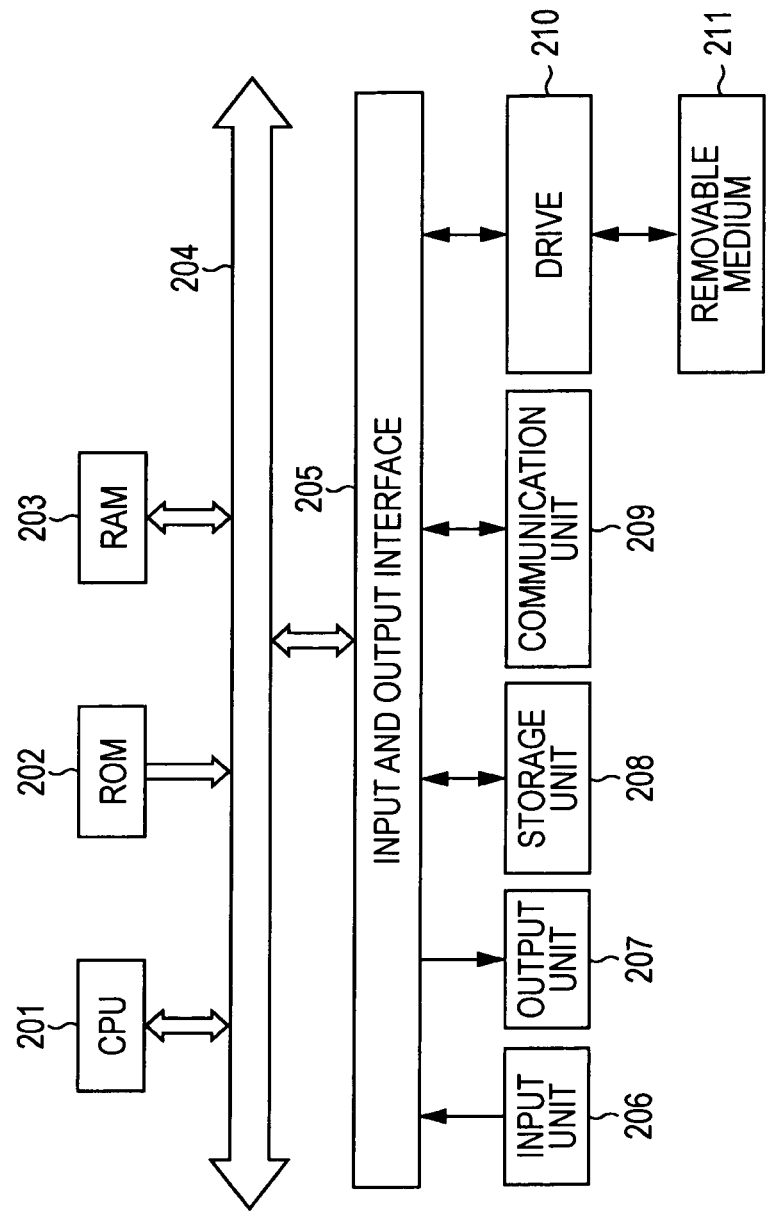

METHOD, PROGRAM AND DEVICE TO ADD AN ERROR CORRECTION CODE TO A TRANSMISSION SIGNAL

CROSS-REFERENCE TO RELATED APPLICATION

The present application claims priority from Japanese Patent Application No. JP 2010-080514 filed in the Japanese Patent Office on Mar. 31, 2010, the entire content of which is incorporated herein by reference.

BACKGROUND OF THE INVENTION

1. Field of the Invention

The present invention relates to a transmission device, a transmission method, and a program, and more particularly to a transmission device, a transmission method, and a program capable of adding an error correction code (ECC) to data such as, for example, a video signal for transmission, without generation of redundant data.

2. Description of the Related Art

A transmission device such as a portable telephone or a notebook type personal computer (hereinafter, referred to as a notebook PC) uses a movable member in a hinge portion which makes a connection between a main body portion which is operated by a user and a display portion which displays information, for the most part. However, a plurality of signal lines or power supply lines is disposed in this hinge portion. For example, wires for video signals transmitted to the display portion, or an LED (light emitting diode) backlight for providing light to an LCD (liquid crystal display) are disposed in the hinge portion. For this reason, in order to maintain the reliability of the signal lines or the power supply lines, it is necessary to reduce the number of the signal lines passing through the hinge portion.

Hitherto, in many transmission devices, data is transmitted between the main body portion and the display portion in a parallel transmission method in which plural pieces of data are transmitted using a plurality of signal lines, and thus the number of signal lines used for the data transmission increases.

Therefore, in order to reduce the number of the signal lines used for the data transmission, the parallel transmission method may be changed to a serial transmission method.

Here, the serial transmission method is a method in which a plurality of data streams input in parallel is converted into a serial data stream (hereinafter, referred to as serial data), and the serial data obtained by the conversion is transmitted using a single signal line. However, in the case of the serial transmission method, in order to realize a transmission rate similar to that in the parallel transmission method, it is necessary to perform the transmission with frequency clocks higher than in the parallel transmission method.

If the clocks come to have a high rate in a serial transmission path, a frequency spectrum of the transmission signal becomes broad in the band and thus an electromagnetic interference (EMI) occurs in some cases. The high rate of the clocks leads to increase in power consumption. On the other hand, in recent years, there is a demand for data transmission at a higher rate due to great improvement in the resolution of LCDs.

For this reason, a study on the suppression of an effect of EMI, the decrease in an amount of power consumption, and the realization of the high rate data transmission, is necessary. As one method satisfying the demand, serial data is encoded based on an appropriate encoding method.

As well known encoding methods, there are, for example, NRZ (non-return to zero) encoding method, a Manchester encoding method, an AMI (alternate mark inversion) encoding method, and the like. Also, Japanese Unexamined Patent Application Publications No. 3-109843 discloses a technique in which data is transmitted using the AMI encoding.

Further, recently, an encoding method (hereinafter, referred to as a new method) has been developed in which a DC component is not included, and a clock component is easily extracted from a received signal. This new method is a method in which serial data is encoded by the AMI encoding method, the Manchester encoding method or the like, and clocks are synchronously added to symbol streams obtained by the encoding so as to be transmitted. A transmission signal generated based on the new method does not include a DC component and thus can be transmitted via a power supply line. In addition, it is possible to extract a clock component from the received signal without use of a PLL (phase locked loop) circuit. Thereby, if the new method is applied, it is possible to reduce the number of signal lines and power consumption.

SUMMARY OF THE INVENTION

However, even if the new method is used, it is difficult to improve the transmission rate without high rate clocks. In a case of transmitting a transmission signal using a transmission path such as the power supply line, an error may occur in the transmission signal.

It is desirable to efficiently transmit a transmission signal by adding an error correction code (ECC) which does not generate redundant data, to the transmission signal which enables data to be transmitted at a high rate without increase in a clock frequency.

According to an embodiment of the present invention, there is provided a transmission device including a first conversion means that converts first transmission target data which is a target of transmission into first transmission data formed by N symbol values each of which indicates any one of plural values set in advance, with predetermined units of data, based on a first conversion table stored in advance; a second conversion means that converts first error correction data, which is used to correct an error occurring in the first transmission target data, into first symbol data formed by the a symbol values, based on a second conversion table stored in advance; a third conversion means that converts second transmission target data different from the first transmission target data into second symbol data formed by the (N-a) symbol values, based on a third conversion table stored in advance; an addition and generation means that adds the second symbol data to the first symbol data and generates second transmission data formed by the N symbol values; and a transmission means that transmits a transmission signal formed by the first and second transmission data.

The transmission device may further include a fourth conversion means that converts second error correction data which is used to correct an error occurring in the second transmission target data, into third symbol data formed by the a symbol values, based on a fourth conversion table stored in advance. The addition and generation means may add predetermined symbol data to the third symbol data and generate third transmission data formed by the N symbol values. The transmission means may transmit the transmission signal formed by the first to third transmission data.

The transmission means may superpose the transmission signal on a current as a power and transmits the superposed transmission signal.

The transmission device may further include a separation means that separates the transmission signal transmitted by the transmission means from the current; a first inverse conversion means that converts the first transmission data included in the transmission signal into the first transmission target data based on a conversion table, stored in advance, which is the same as the first conversion table; an extraction means that extracts the first symbol data and the second symbol data from the second transmission data included in the transmission signal; a second inverse conversion means that converts the first symbol data into the first error correction data based on a conversion table, stored in advance, which is the same as the second conversion table; an error correction means that corrects an error occurring in the first transmission target data based on the first error correction data; a third inverse conversion means that converts the second symbol data into the second transmission target data based on a conversion table, stored in advance, which is the same as the third conversion table; and a processing means that performs a predetermined process based on the first transmission target data after the error is corrected and the second transmission target data.

Both the first and second transmission data is formed by symbol values of which a sum total may become 0, and the transmission means may superpose a transmission signal formed by symbol values of which a sum total becomes 0, on the current and transmit the superposed transmission signal.

The transmission device may further include a fifth conversion means that converts the first transmission data corresponding to the first transmission target data into data for generation used to generate the first error correction data; and an error correction data generation means which generates the first error correction data based on the data for generation.

According to an embodiment of the present invention, there is provided a transmission method in a transmission device transmitting a transmission signal, including a first conversion means; a second conversion means; a third conversion means; an addition and generation means; and a transmission means, the method including the steps of causing the first conversion means to convert first transmission target data which is a target of transmission into first transmission data formed by N symbol values each of which indicates any one of plural values set in advance, with predetermined units of data, based on a first conversion table stored in advance; causing the second conversion means to convert first error correction data, which is used to correct an error occurring in the first transmission target data, into first symbol data formed by the a symbol values, based on a second conversion table stored in advance; causing the third conversion means to convert second transmission target data different from the first transmission target data into second symbol data formed by the (N-a) symbol values, based on a third conversion table stored in advance; causing the addition and generation means that adds the second symbol data to the first symbol data to generate second transmission data formed by the N symbol values; and causing the transmission means to transmit a transmission signal formed by the first and second transmission data.

According to an embodiment of the present invention, there is provided a program enabling a computer to function as a first conversion means that converts first transmission target data which is a target of transmission into first transmission data formed by N symbol values each of which indicates any one of plural values set in advance, with predetermined units of data, based on a first conversion table stored in advance; a second conversion means that converts first error correction data, which is used to correct an error occurring in the first transmission target data, into first symbol data formed by the a symbol values, based on a second conversion table stored in advance; a third conversion means that converts second transmission target data different from the first transmission target data into second symbol data formed by the (N-a) symbol values, based on a third conversion table stored in advance; an addition and generation means that adds the second symbol data to the first symbol data and generates second transmission data formed by the N symbol values; and a transmission means that transmits a transmission signal formed by the first and second transmission data.

According to an embodiment of the present invention, first transmission target data which is a target of transmission is converted into first transmission data formed by N symbol values each of which indicates any one of plural values set in advance, with predetermined units of data, based on a first conversion table stored in advance, first error correction data, which is used to correct an error occurring in the first transmission target data, is converted into first symbol data formed by the a symbol values, based on a second conversion table stored in advance, second transmission target data different from the first transmission target data is converted into second symbol data formed by the (N-a) symbol values, based on a third conversion table stored in advance, the second symbol data is added to the first symbol data and second transmission data formed by the N symbol values is generated, and a transmission signal formed by the first and second transmission data is transmitted.

According to the present invention, it is possible to efficiently transmit data without generating redundant data in a transmission signal to which an error correction code (ECC) is added.

BRIEF DESCRIPTION OF THE DRAWINGS

FIG. 5 is a diagram illustrating an example of a table A used for 14B8Q conversion.

FIG. 6 is a diagram illustrating an example of a table B used for the 14B8Q conversion.

FIG. 7 is a diagram illustrating an example of a table C used for the 14B8Q conversion.

FIG. 8 is a diagram illustrating an example of a table D used for the 14B8Q conversion.

FIG. 12 is a diagram illustrating an example of a conversion table used to convert a high rate symbol stream into a binary stream for an FEC operation.

FIG. 13 is a diagram illustrating an example of a conversion table used for 8B6Q conversion.

FIG. 14 is a diagram illustrating an example of the 8B6Q conversion.

FIG. 15 is a diagram illustrating an example of a conversion table used for 2B2Q conversion.

FIG. 16 is a flowchart illustrating a data transmitting process performed by a transmitting unit.

FIG. 21 is a diagram illustrating an example of a table A used for 12B8Q conversion.

FIG. 22 is a diagram illustrating an example of a table B used for the 12B8Q conversion.

FIG. 23 is a diagram illustrating an example of a table C used for the 12B8Q conversion.

FIG. 24 is a diagram illustrating an example of a table D used for the 12B8Q conversion.

FIG. 28 is a diagram illustrating an example of a conversion table used to convert a high rate symbol stream into a binary stream for an FEC operation.

FIG. 29 is a first diagram illustrating an example of a conversion table used for 8B6Q conversion.

FIG. 30 is a second diagram illustrating an example of a conversion table used for 8B6Q conversion.

FIG. 32 is a diagram illustrating an example of a conversion table used for 2B2Q conversion.

FIG. 33 is a block diagram illustrating a configuration example of a computer.

DESCRIPTION OF THE PREFERRED EMBODIMENTS

Figure 1:
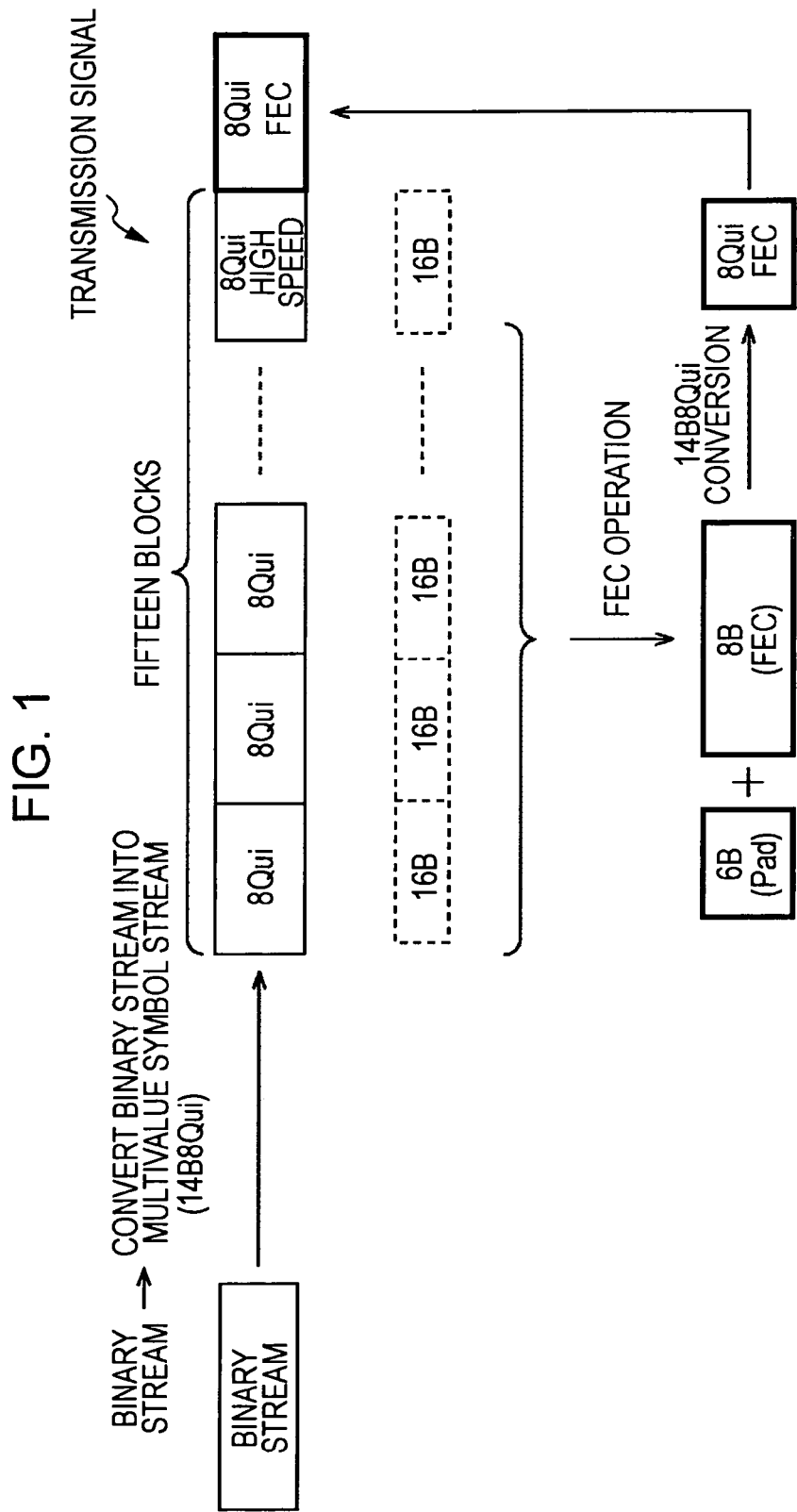
FIG. 1 is a first diagram illustrating an outline of the invention which has been filed.

Hereinafter, embodiments of the present invention will be described. The description will be made in the following order.

1. Outline of the Invention which has been Filed
2. First Embodiment
3. Second Embodiment
4. Modified Examples 1. Outline of the Invention which has been Filed As the invention which has been filed by the present applicant, an addition method has been proposed in which an error correction code (ECC) which can correct a degree of error of one level occurring in a transmission path is added to a multi-value transmission signal which enables higher rate data transmission to be realized without increase in a clock frequency.

Hereinafter, details where the invention which has been filed by the present applicant has been made will be described.

In other words, as described above, if the new method is applied, the number of signal lines and the power consumption decrease, but it is difficult to increase the transmission rate without the high rate clocks even if the new method is used.

On the other hand, as an encoding method for transmitting more data without the high rate clocks, an 8B6T conversion which is defined in, for example, IEEE (institute of electrical and electronics engineers) 802.3u is known.

This uses, for example, three values, −1, 0, and 1, and thus can transmit data 1.33 times more than the case of using two values at the same clock frequency. Also, if the number of multiple values increases, more data can be transmitted.

However, in a case of an encoding method in which a binary stream formed by a plurality of bits is encoded to a symbol stream formed by symbol values of multiple values, even if only one level of error occurs in a transmission path in an amplitude direction, the error expands as an error regarding the plurality of bits. For this reason, if such an encoding method is applied, it is necessary to add an error correction code (ECC) (for example, a convolution code or the like) which can correct the error in the plurality of bits to the serial data.

However, in order to use the error correction code (ECC) which can correct the error in the plurality of bits, a relatively large scale circuit for the error correction is necessary. In addition, since an operation amount for the error correction increases, it leads to increase in power consumption, increase in manufacturing costs, and increase in the chip size.

Therefore, the present applicant has made the invention in which the one level degree of error occurring in the transmission path can be corrected using an error correction code (ECC) which has error correction capacity of 1 bit, regarding the transmission signal which enables higher rate data transmission to be realized without increase in the clock frequency.

Next, an outline of the invention which has been filed by the present applicant will be described with reference to FIGS. 1 and 2.

In the invention described with reference to FIGS. 1 and 2, for example, in a notebook type PC, a video signal which is supplied from a main body to a display is converted into a transmission signal which is supplied via a power supply line, a signal line or the like.

In the invention which has been filed, 14B (binary)8Q (quinary) conversion is performed in which a plurality of bits forming a binary stream indicating data such as, for example, a video signal are converted into eight symbol values with 14-bit units. Also, the symbol value indicates any one value selected from a plurality of values.

In addition, in the invention which has been filed, for example, error correction information (error correction code (ECC)) is generated in order to correct an error occurring in data such as a video signal corresponding to fifteen symbol streams in which eight symbol values obtained by the 14B8Q conversion forms a symbol stream.

In addition, a transmission signal obtained by adding the generated error correction information to the fifteen symbol streams is transmitted from the main body to the display.

Here, details of the 14B8Q conversion are disclosed in Japanese Patent Application No. 2009-250804 which has been filed. In addition, details of a method of generating the error correction information are disclosed in Japanese Patent Application No. 2010-008454 which has been filed.

FIG. 1 shows the 14B8Q conversion in which 14 bits are converted into eight symbol values, and a method of generating the error correction information performed when the 14B8Q conversion is performed.

As shown in the upper part of FIG. 1, a plurality of bits forming binary streams is divided every 14 bits. Also, the 14B8Q conversion is performed in which the 14-bit binary stream obtained by the division is converted into a symbol stream ("8Qui" shown in FIG. 1) formed by eight symbol values.

In addition, fifteen symbol streams obtained by the 14B8Q conversion are respectively converted into binary streams ("16B" shown in FIG. 1) for an FEC operation formed by 16 bits. Thereby, the binary streams for an FEC operation formed by 240 (=15×16) bits are obtained.

Further, as shown in the center of FIG. 1, the FEC operation for generating, for example, 8-bit error correction information is performed based on the obtained 240-bit binary streams for the FEC operation, and, as a result, the 8-bit error correction information ("8B(FEC)" shown in FIG. 1) is obtained.

In the FEC operation, as a polynomial expression for generating the 8-bit error correction information, for example, $x8+x4+x3+x2+1$ or the like may be used. In addition, for example, in the FEC operation, the FEC operation is performed by BCH (248, 240) based on the 240-bit binary streams for the FEC operation, and then an 8-bit BCH code is operated as the error correction information.

Figure 2:
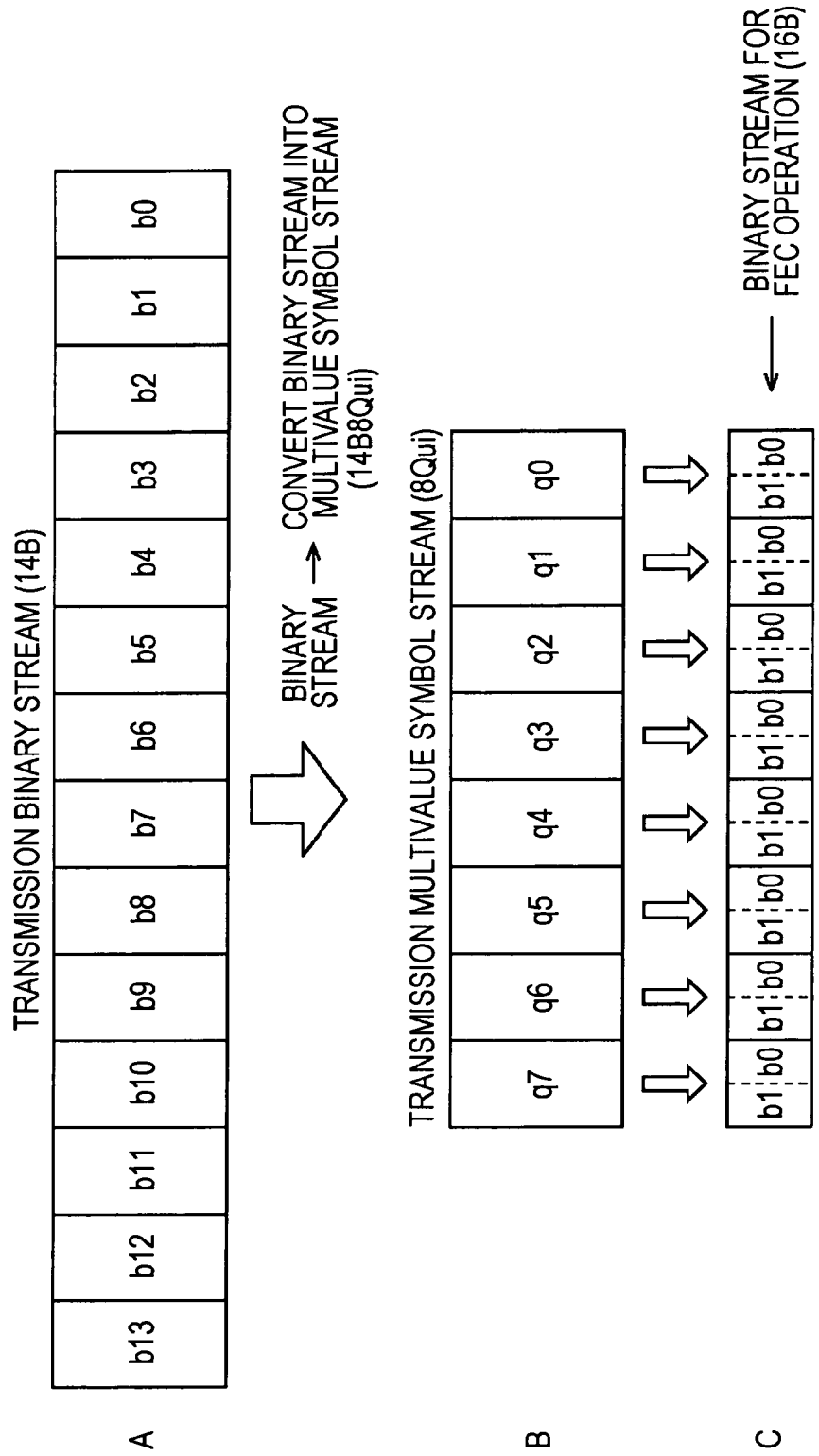
FIG. 2 is a second diagram illustrating an outline of the invention which has been filed.

Next, FIG. 2 shows a state where the symbol stream is obtained by the 14B8Q conversion and a state where the binary stream for the FEC operation is obtained based on the symbol stream.

In A of FIG. 2, a binary stream which is a target of the 14B8Q conversion and is formed by 14 bits b0 to b13 is shown.

In B of FIG. 2, a symbol stream which is obtained as a result of the 14B8Q conversion and is formed by eight symbol values q0 to q7 is shown.

In C of FIG. 2, an FEC operation binary stream obtained as a result of the symbol stream shown in B of FIG. 2 being converted into a binary stream for the FEC operation, is shown.

The 14B8Q conversion is performed for the binary stream of 14 bits b0 to b13, and the symbol stream formed by the eight symbol values q0 to q7 obtained by the 14B8Q conversion is obtained.

Each of the symbol values q0 to q7 forming the symbol stream is converted into 2 bits b0 and b1 (shown in C of FIG. 2). Through this conversion, the symbol values q0 to q7 forming the symbol stream is converted to the 16-bit binary stream for the FEC operation.

Thereby, a 240-bit binary stream for the FEC operation is obtained from fifteen symbol streams, and, for example, the 8-bit error correction information ("8B (FEC)" shown in FIG. 1) is obtained based on the obtained 240-bit binary stream for the FEC operation.

Here, in order to add the 8-bit error correction information to the fifteen symbol streams for transmission, it is necessary to perform the 14B8Q conversion for the 8-bit error correction information.

In addition, by the 14B8Q conversion, the binary stream formed by 14 bits is converted into the symbol stream formed by eight symbol values.

Therefore, 6-bit padding data (6-bit data having a value 0) is added to a leading portion of the 8-bit error correction information, the 14B8Q conversion is performed for a 14-bit binary stream obtained as a result thereof, and thereby a symbol stream ("8Qui FEC" shown in FIG. 1) is obtained as an FEC symbol stream.

A transmission signal is obtained by adding one FEC symbol stream ("8Qui FEC" shown in FIG. 1) corresponding to the error correction information to the fifteen symbol streams ("8Qui" shown in FIG. 1) corresponding to the binary stream indicating data such as a video signal.

This transmission signal is supplied from the main body to the display via the signal line or the power supply line.

In the fifteen symbol streams included in the transmission signal, an additional value obtained by summing the eight symbol values forming the symbol stream becomes 0. Also, in one FEC symbol stream included in the transmission signal, an additional value obtained by summing the eight symbol values forming the FEC symbol stream becomes 0.

Therefore, since the transmission signal does not include a DC component, for example, even if the main body side superposes the transmission signal on a current as a power and transmits the superposition signal obtained as a result thereof via the power supply line, the display side can easily separate the transmission signal from the current without damaging the data indicated by the transmission signal.

According to the invention which has been filed by the present applicant, since the FEC symbol stream as the error correction information is included in the transmission signal, it is possible to correct the one level degree of error (an error in which each of the symbol values forming the symbol stream varies by 1) occurring in the transmission path with respect to the fifteen symbol streams included in the transmission signal.

For this reason, according to the invention which has been filed by the present applicant, since errors occurring in the transmission signal during the serial transmission can be corrected, it is possible to improve transmission quality of the transmission signal.

In addition, in FIG. 1, the 6-bit padding data is added to the 8-bit error correction information, and then the conversion is performed by the 14B8Q conversion.

Here, data such as a video signal which is supplied from the main body to the display may be added instead of the 6-bit padding data. However, in this case, in a case where the display side performs an inverse 14B8Q conversion and obtains the 8-bit error correction information, the display side may not obtain the exact 8-bit error correction information.

Therefore, even if the data such as the video signal is added instead of the 6-bit padding data which is redundant data, the present applicant makes a transmission signal so as to be generated, which enables the 8-bit error correction information to be exactly obtained in the display side, so as to supply data more efficiently.

2. First Embodiment

Figure 3:
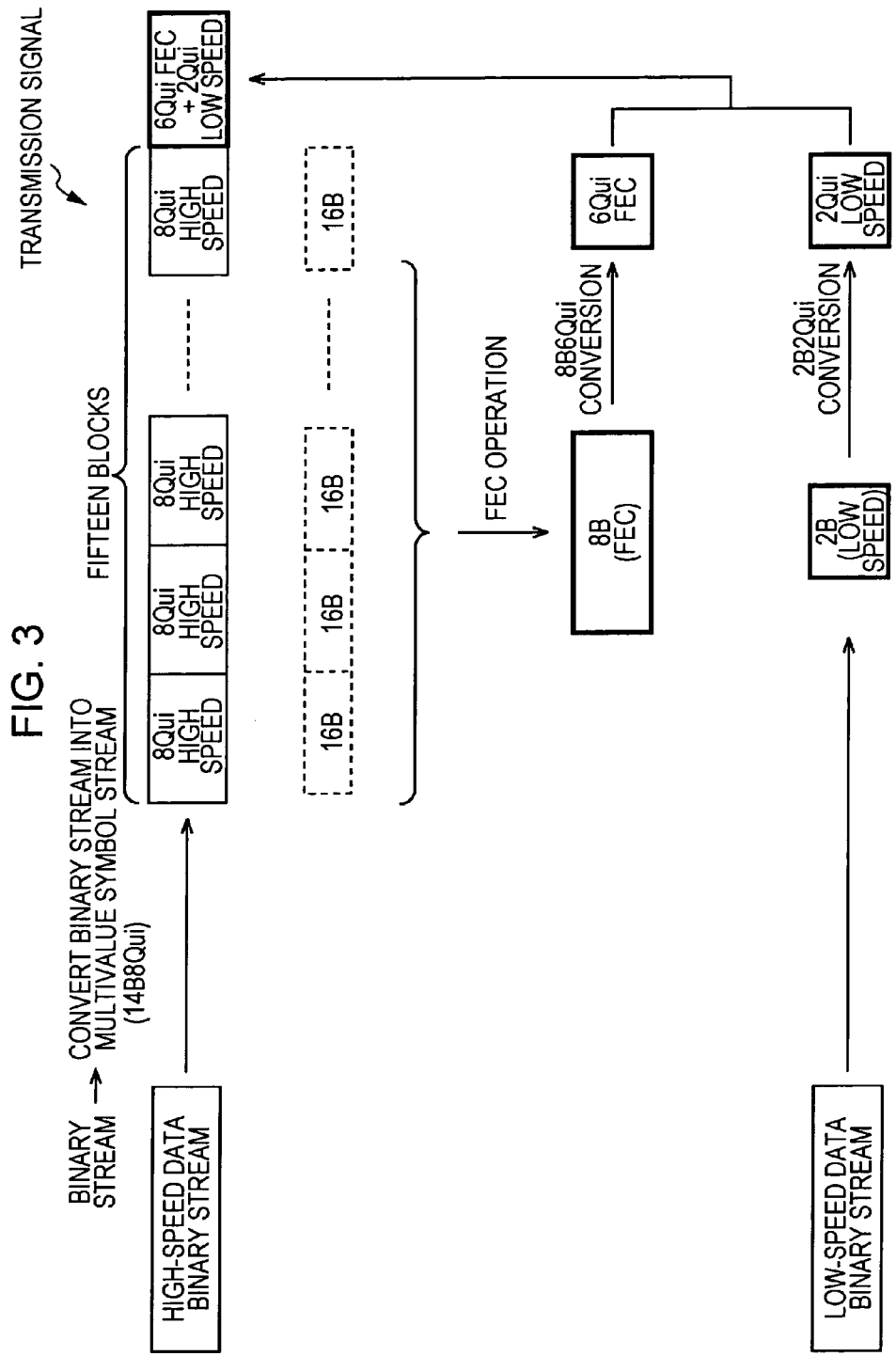
FIG. 3 is a diagram illustrating an outline of a first embodiment.

Next, FIG. 3 shows an outline of a first embodiment.

In the first embodiment, the part for generating the 8-bit error correction information is the same as the description made with reference to FIGS. 1 and 2.

In other words, in the first embodiment, the following is a main point and is different from the description made with reference to FIGS. 1 and 2.

Specifically, in the first embodiment, as shown in the lower part of FIG. 3, for the 8-bit error correction information, 8B6Q conversion is performed in which 8 bits are converted into six symbol values, and, for 2 bits indicating low rate data ("2B (low rate)" shown in FIG. 3), 2B2Q conversion is performed in which 2 bits are converted into two symbol values, which are different from the description made with reference to FIGS. 1 and 2.

Here, the low rate data means data having a data amount smaller than data transmitted through the conversion by the 14B8Q conversion. Also, the data transmitted through the conversion by the 14B8Q conversion is referred to as high rate data with respect to the low rate data.

Thereby, in the first embodiment, a plurality of bits indicating the high rate data is converted with 14-bit units by the 14B8Q conversion. Hereinafter, the symbol stream formed by the eight symbol values obtained by the 14B8Q conversion is referred to as a high rate symbol stream.

Further, in the first embodiment, the definition of the transmission signal is different therefrom. That is to say, the transmission signal is obtained by adding an FEC low rate symbol stream ("6Qui FEC+2Qui low rate" shown in FIG. 3) to fifteen high rate symbol streams ("8Qui high rate" shown in FIG. 3), and, here, the FEC low rate symbol stream is obtained by adding the low rate symbol stream ("2Qui low rate" shown in FIG. 3) obtained by the 2B2Q conversion to the FEC symbol stream ("6Qui FEC" shown in FIG. 3) formed by the six symbol values obtained by the 8B6Q conversion.

Figure 4:
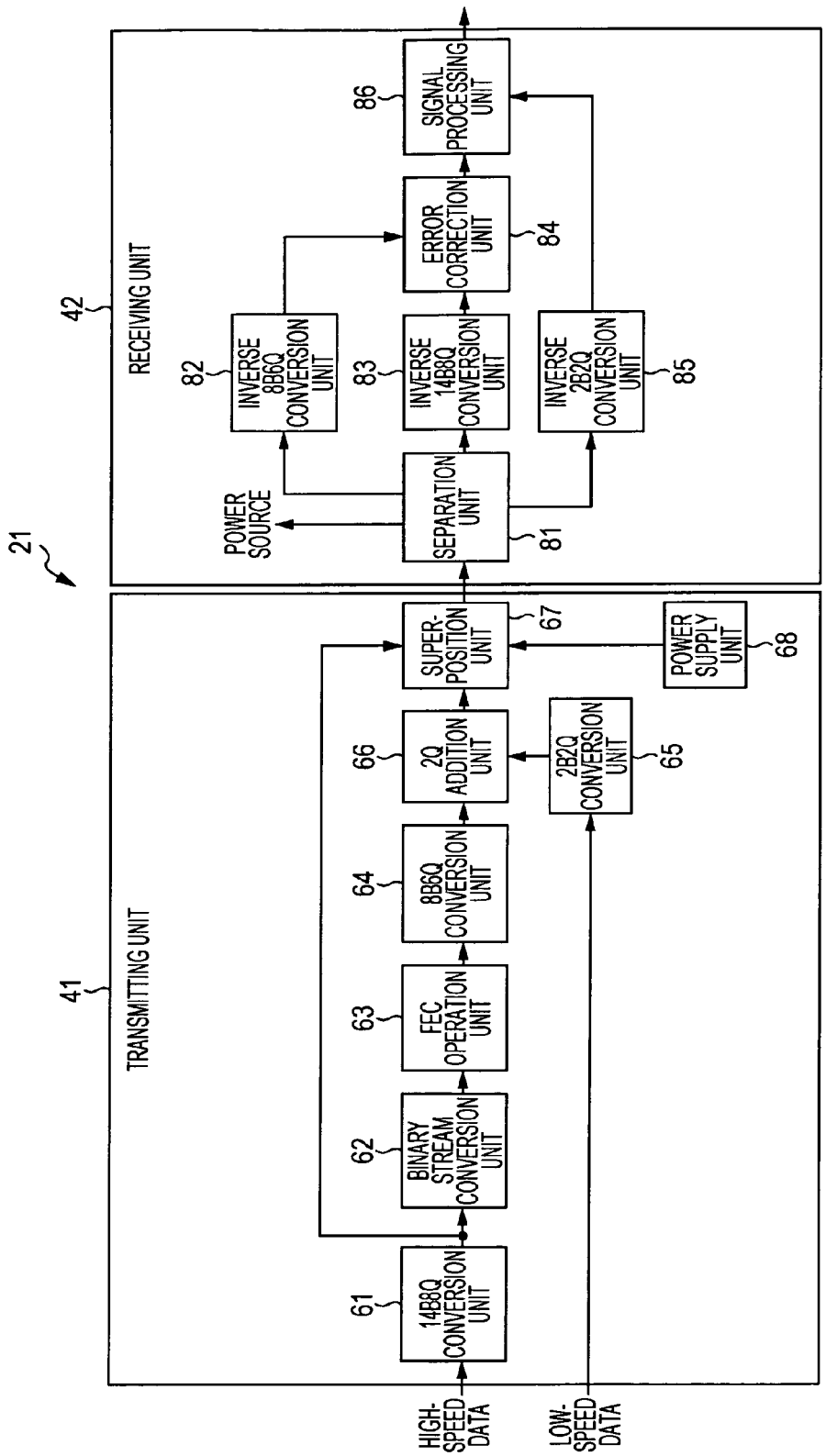
FIG. 4 is a block diagram illustrating a configuration diagram of a notebook type PC according to the first embodiment.

FIG. 4 shows a configuration of a notebook type PC 21 according to the first embodiment.

The notebook type PC 21 includes a transmitting unit and a receiving unit 42. The transmitting unit 41 corresponds to a main body of the notebook type PC 21 and the receiving unit 42 corresponds to a display of the notebook type PC 21. The transmitting unit 41 and the receiving unit are connected to each other via power supply lines for supplying power and the like as well as signal lines supplying a video signal and the like.

The transmitting unit 41 includes a 14B8Q conversion unit 61, a binary stream conversion unit 62, an FEC operation unit 63, an 8B6Q conversion unit 64, a 2B2Q conversion 65, a 2Q addition unit 66, a superposition unit 67, and a power supply unit 68.

The transmitting unit 41 converts supplied data into a transmission signal for transmission to the receiving unit 42 from the transmitting unit 41. Also, the transmitting unit transmits a superposition signal obtained by superposing the transmission signal on a current to the receiving unit 42 via the power supply line.

Also, in the first embodiment, a case where the transmitting unit 41 superposes a transmission signal on a current and transmits a superposition signal obtained as a result thereof to the receiving unit 42 via the power supply line is described, but a method of transmitting the transmission signal is not limited thereto.

In other words, for example, the transmission signal may be transmitted to the receiving unit 42 via the signal line in the first embodiment. This is true of a second embodiment described later.

The 14B8Q conversion unit 61 divides a high rate binary stream which is supplied and is formed by a plurality of bits indicating high rate data into 14-bit high rate binary streams. The 14B8Q conversion unit 61 performs the 14B8Q conversion for the respective 14-bit high rate binary streams obtained by the division so as to be converted into high rate symbol streams each of which is formed by eight symbol values.

In the first embodiment, the symbol value is any one of, for example, five values {−2, −1, 0, 1, 2}.

The 14B8Q conversion unit 61 stores in advance a conversion table used for the 14B8Q conversion in an internal memory (not shown).

Conversion tables used for the 14B8Q conversion performed by the 14B8Q conversion unit 61 will be described with reference to FIGS. 5 to 8. In the first embodiment, as the conversion tables, a table A, a table B, a table C, and a table D may be used.

FIG. 5 shows the table A used for the 14B8Q conversion when the higher 2 bits among the respective bits forming the 14-bit high rate binary stream are "00".

In the table A shown in FIG. 5, binary streams each of which is formed by 5 bits are shown in the first column from the left. In the second to fifth columns from the left, symbol streams each of which is formed by four symbol values obtained by converting the binary stream written in the first column from the left are shown.

Binary streams each of which is formed by 5 bits are shown in the sixth column from the left. In the seventh to tenth columns from the left, symbol streams each of which is formed by four symbol values obtained by converting the binary stream written in the sixth column from the left are shown. This is the same as in FIGS. 6 to 8 described later.

In the table A shown in FIG. 5, the sum total of four symbol values obtained by the conversion becomes 0.

FIG. 6 shows the table B used for the 14B8Q conversion when the higher 2 bits among the respective bits forming the 14-bit high rate binary stream are either "01" or "10".

In the table B shown in FIG. 6, the sum total of four symbol values obtained by the conversion becomes 1.

FIGS. 7 and 8 show the tables C and D used for the 14B8Q conversion when the higher 2 bits among the respective bits forming the 14-bit high rate binary stream are "11".

In the table C shown in FIG. 7, the sum total of four symbol values obtained by the conversion becomes 2.

In the table D shown in FIG. 8, the sum total of four symbol values obtained by the conversion becomes 3.

Figure 9:
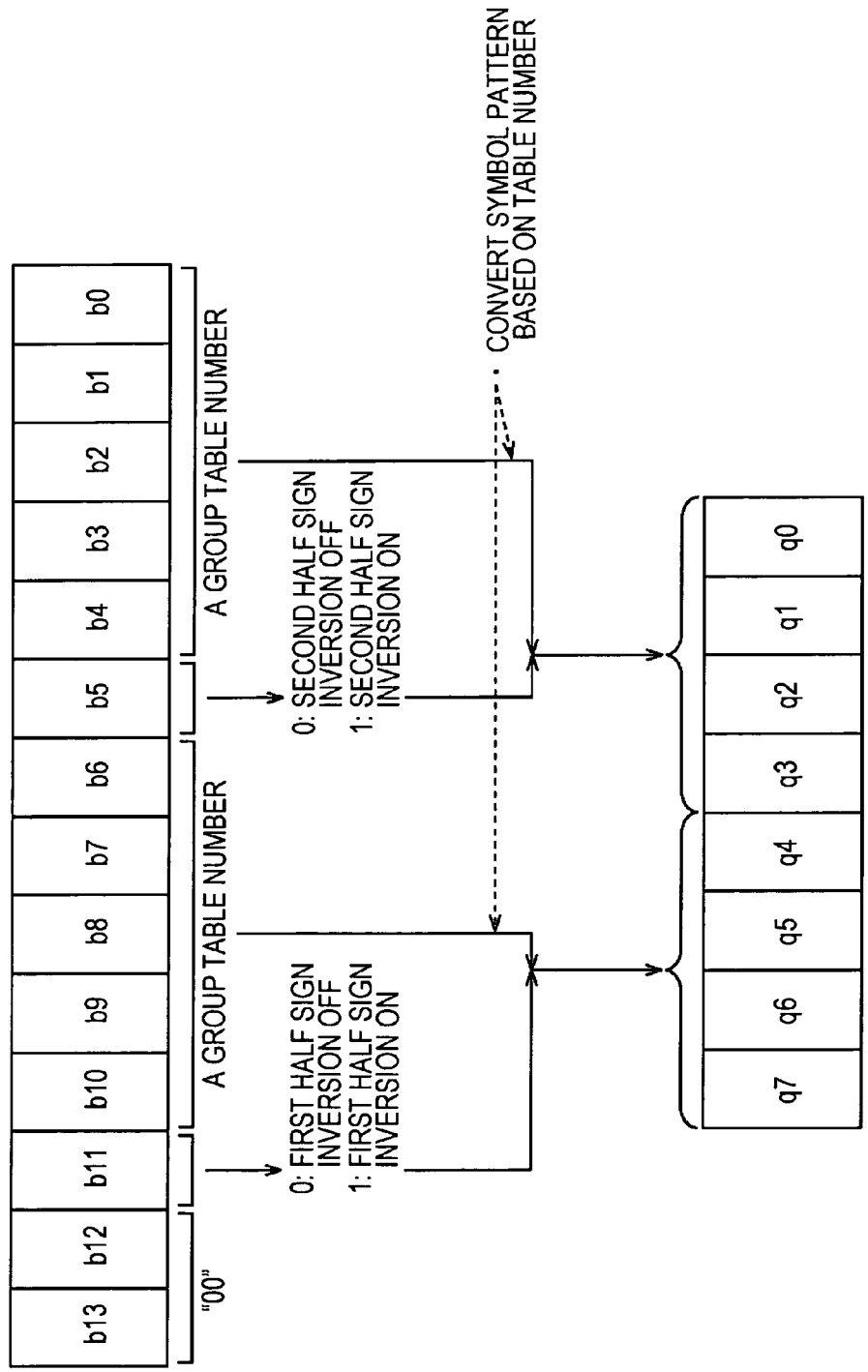
FIG. 9 is a diagram illustrating an example of the 14B8Q conversion using the table A.
Figure 10:
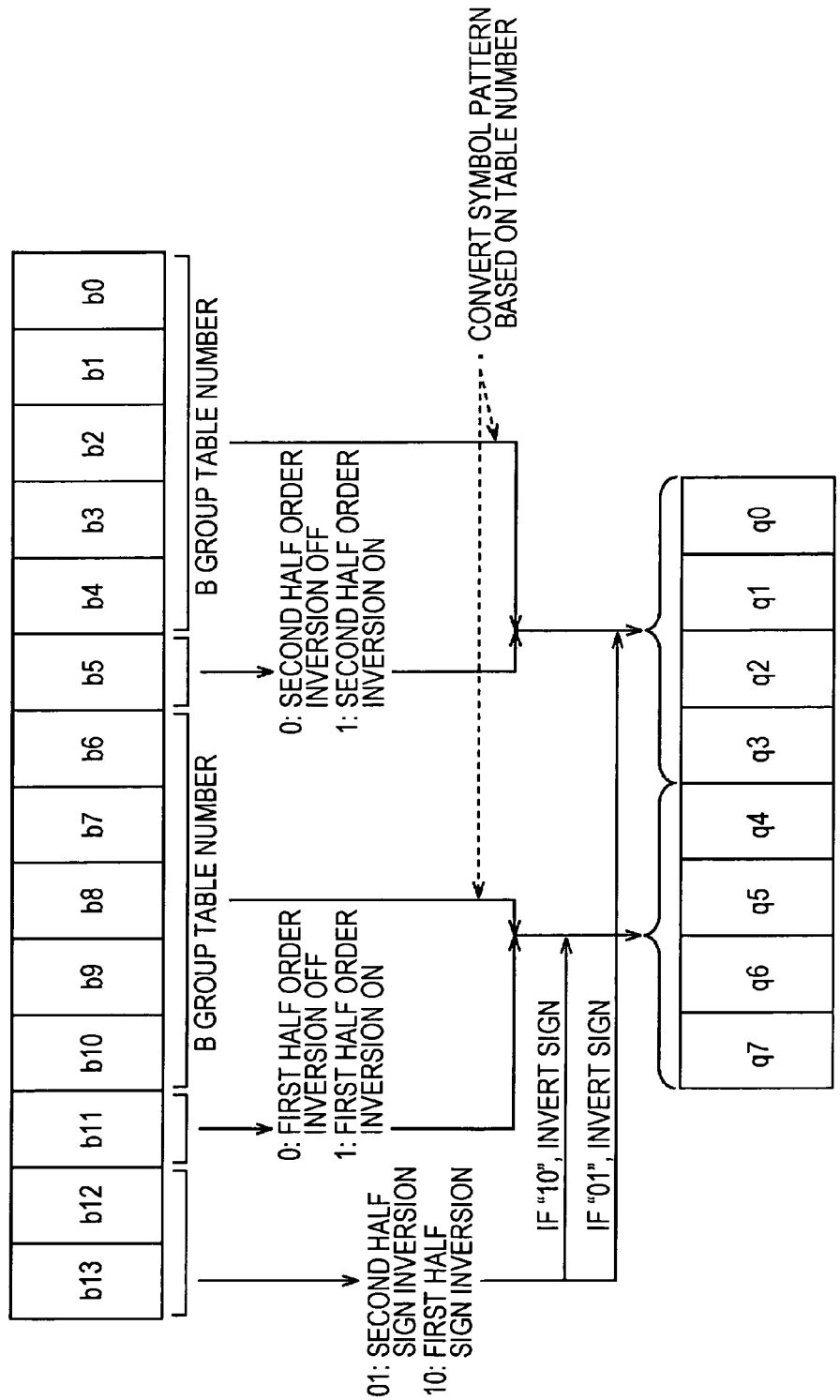
FIG. 10 is a diagram illustrating an example of the 14B8Q conversion using the table B.
Figure 11:
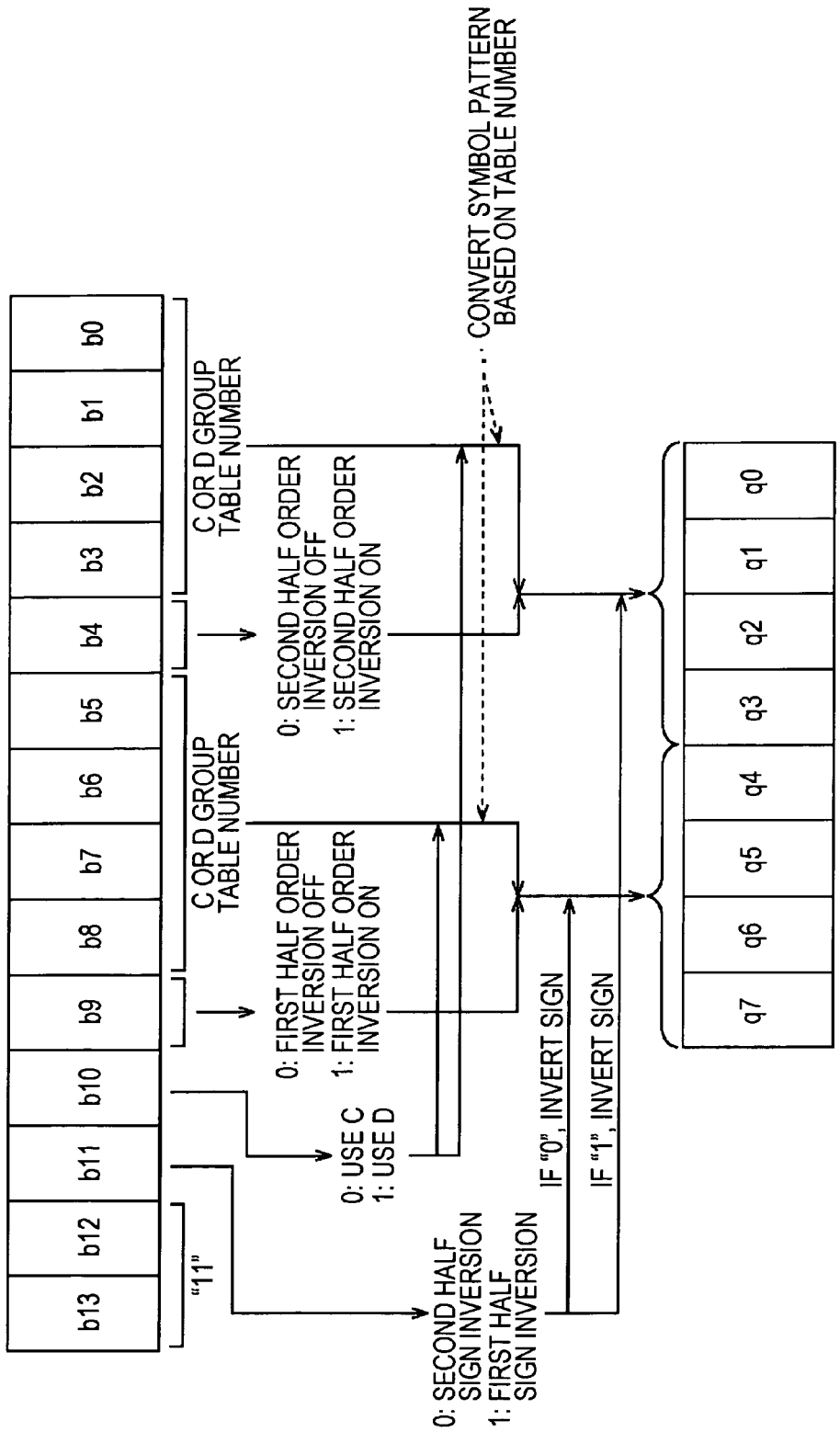
FIG. 11 is a diagram illustrating an example of the 14B8Q conversion using the table C or the table D.

With reference to FIGS. 9 to 11, the 14B8Q conversion using the table A in FIG. 5, the 14B8Q conversion using the table B in FIG. 6, and the 14B8Q conversion using the tables C and D in FIGS. 7 and 8, will be described.

FIG. 9 shows details of the 14B8Q conversion using the table A, which is performed when the higher 2 bits among the respective bits forming the 14-bit high rate binary stream are "00".

In the upper part of FIG. 9, the high rate binary stream formed by 14 bits b0 to b13 is shown. Also, in the lower part of FIG. 9, the high rate symbol stream formed by eight symbol values q0 to q7 is shown. This is the same as in FIGS. 10 and 11 described later.

The 14B8Q conversion unit 61 converts 5 bits b0 to b4 among the 14 bits b0 to b13 forming the high rate binary stream into four symbol values q0' to q3' based on the table A.

In addition, the 14B8Q conversion unit 61 determines whether a value of the 1 bit b5 among the 14 bits b0 to b13 forming the high rate binary stream is 0 or 1, and if it is determined that the value of the 1 bit b5 is 1, reverses the respective signs of the four symbol values q0' to q3' obtained by the conversion. The 14B8Q conversion unit 61 obtains four symbol values q0 to q3 which are newly obtained through the determination of the signs, as final conversion results.

If it is determined that the value of the 1 bit b5 is 0, the 14B8Q conversion unit 61 does not reverse the respective signs of the four symbol values q0' to q3' obtained by the conversion and obtains the four symbol values q0' to q3' as four symbol values q0 to q3 which are final conversion results.

In addition, the 14B8Q conversion unit 61 converts the 5 bits b6 to b10 among the 14 bits b0 to b13 forming the high rate binary stream into four symbol values q4' to q7' based on the table A.

In addition, the 14B8Q conversion unit 61 determines whether a value of 1 bit b11 among the 14 bits b0 to b13 forming the high rate binary stream is 0 or 1, and if it is determined that the value of the 1 bit b11 is 1, reverses the respective signs of the four symbol values q4' to q7' obtained by the conversion. The 14B8Q conversion unit 61 obtains four symbol values q4 to q7 which are newly obtained through the determination of the signs, as final conversion results.

If it is determined that the value of the 1 bit b11 is 0, the 14B8Q conversion unit 61 does not reverse the respective signs of the four symbol values q4' to q7' obtained by the conversion and obtains the four symbol values q4' to q7' as four symbol values q4 to q7 which are final conversion results.

In this way, the 14B8Q conversion unit 61 converts the 14 bits b0 to b13 into the eight symbol values q0 to q7 using the table A. In this case, in the eight symbol values q0 to q7, the sum total of the four symbol values q0 to q3 is 0, and the sum total of the four symbol values q4 to q7 is 0.

Therefore, the sum total of the eight symbol values q0 to q7 is also 0. For this reason, a high rate symbol stream formed by the eight symbol values q0 to q7 does not include a DC component.

Next, FIG. 10 shows details of the 14B8Q conversion using the table B, which is performed when the higher 2 bits among the respective bits forming the 14-bit high rate binary stream are either "01" or "10".

The 14B8Q conversion unit 61 converts 5 bits b0 to b4 among the 14 bits b0 to b13 forming the high rate binary stream into four symbol values q0' to q3' based on the table B.

In addition, the 14B8Q conversion unit 61 determines whether a value of 1 bit b5 among the 14 bits b0 to b13 forming the high rate binary stream is 0 or 1, and if it is determined that the value of the 1 bit b5 is 1, reverses the order of the four symbol values q0' to q3' obtained by the conversion.

Specifically, if it is determined that the value of the 1 bit b5 is 1, the 14B8Q conversion unit 61 converts the respective values of the four symbol values q0' to q3' (q0', q1', q2', q3')=(−2, −1, 0, 1), into (q0', q1', q2', q3')=(1, 0, −1, −2).

In addition, if it is determined that the value of the 1 bit b5 is 0, the 14B8Q conversion unit 61 does not reverse the order of the four symbol values q0' to q3' obtained by the conversion.

Further, the 14B8Q conversion unit 61 performs the process described below according to the values of the higher 2 bits b13 and b12 among the 14 bits b0 to b13 forming the high rate binary stream.

That is to say, if the higher 2 bits b13 and b12 among the 14 bits b0 to b13 forming the high rate binary stream are "01", the 14B8Q conversion unit 61 reverses the respective signs of the four symbol values q0' to q3'. The 14B8Q conversion unit 61 obtains four symbol values q0 to q3 which are newly obtained through the reversal of the signs, as final conversion results.

Also, if the higher 2 bits b13 and b12 among the 14 bits b0 to b13 forming the high rate binary stream are not "01", that is, "10", the 14B8Q conversion unit 61 does not reverse the respective signs of the four symbol values q0' to q3' and obtains the four symbol values q0' to q3' as q0 to q3 which are final conversion results.

In addition, The 14B8Q conversion unit 61 converts 5 bits b6 to b10 among the 14 bits b0 to b13 forming the high rate binary stream into four symbol values q4' to q7' based on the table B.

In addition, the 14B8Q conversion unit 61 determines whether a value of 1 bit b11 among the 14 bits b0 to b13 forming the high rate binary stream is 0 or 1, and if it is determined that the value of the 1 bit b11 is 1, reverses the order of the four symbol values q4' to q7' obtained by the conversion.

In addition, if it is determined that the value of the 1 bit b11 is 0, the 14B8Q conversion unit 61 does not reverse the order of the four symbol values q4' to q7' obtained by the conversion.

Further, the 14B8Q conversion unit 61 performs the process described below according to the values of the higher 2 bits b13 and b12 among the 14 bits b0 to b13 forming the high rate binary stream.

That is to say, if the higher 2 bits b13 and b12 among the 14 bits b0 to b13 forming the high rate binary stream are "01", the 14B8Q conversion unit 61 reverses the respective signs of the four symbol values q4' to q7'. The 14B8Q conversion unit 61 obtains four symbol values q4 to q7 which are newly obtained through the reversal of the signs, as final conversion results.

Also, if the higher 2 bits b13 and b12 among the 14 bits b0 to b13 forming the high rate binary stream are not "10", that is, "01", the 14B8Q conversion unit 61 does not reverse the respective signs of the four symbol values q4' to q7' and obtains the four symbol values q4' to q7' as q4 to q7 which are final conversion results.

In this way, the 14B8Q conversion unit 61 converts the 14 bits b0 to b13 into the eight symbol values q0 to q7 using the table B. In this case, in the eight symbol values q0 to q7, the sum total of the four symbol values q0 to q3 is either 1 or −1.

Also, when the sum total of the four symbol values q0 to q3 is 1, the sum total of the four symbol values q4 to q7 is −1, and when the sum total of the four symbol values q0 to q3 is −1, the sum total of the four symbol values q4 to q7 is 1.

Therefore, the sum total of the eight symbol values q0 to q7 becomes 0. For this reason, a high rate symbol stream formed by the eight symbol values q0 to q7 does not include a DC component.

Next, FIG. 11 shows details of the 14B8Q conversion using the table C or the table D, which is performed when the higher 2 bits among the respective bits forming the 14-bit high rate binary stream are "11".

The 14B8Q conversion unit 61 determines whether a value of 1 bit b10 among the 14 bits b0 to b13 forming the high rate binary stream is 0 or 1, and determines either the table C or the table D as a conversion table used for the 14B8Q conversion based on the determination result.

In other words, for example, if it is determined that the value of the 1 bit b10 is 0, the 14B8Q conversion unit 61 determines the table C as a conversion table used for the 14B8Q conversion, and if it is determined that the value of the 1 bit b10 is 1, the 14B8Q conversion unit 61 determines the table D as a conversion table used for the 14B8Q conversion.

The 14B8Q conversion unit 61 converts 4 bits b0 to b3 among the 14 bits b0 to b13 forming the high rate binary stream into four symbol values q0' to q3' based on the determined conversion table.

In addition, the 14B8Q conversion unit 61 determines whether a value of 1 bit b4 among the 14 bits b0 to b13 forming the high rate binary stream is 0 or 1, and if it is determined that the value of the 1 bit b4 is 1, reverses the order of the four symbol values q0' to q3' obtained by the conversion.

In addition, if it is determined that the value of the 1 bit b4 is 0, the 14B8Q conversion unit 61 does not reverse the order of the four symbol values q0' to q3' obtained by the conversion.

Further, the 14B8Q conversion unit 61 performs the process described below according to the value of the 1 bit b11 among the 14 bits b0 to b13 forming the high rate binary stream.

In addition, the 14B8Q conversion unit 61 determines whether the value of the 1 bit b11 among the 14 bits b0 to b13 forming the high rate binary stream is 0 or 1, and if it is determined that the value of the 1 bit b11 is 1, reverses the respective signs of the four symbol values q0' to q3' obtained by the conversion. The 14B8Q conversion unit 61 obtains four symbol values q0 to q3 which are newly obtained through the reversal of the signs, as final conversion results.

If it is determined that the value of 1 bit b11 is 0, the 14B8Q conversion unit 61 does not reverse the respective signs of the four symbol values q0' to q3' and obtains the four symbol values q0' to q3' as four symbol values q0 to q3 which are final conversion results.

In addition, the 14B8Q conversion unit 61 converts 4 bits b5 to b8 among the 14 bits b0 to b13 forming the high rate binary stream into four symbol values q4' to q7' based on the determined conversion table.

In addition, the 14B8Q conversion unit 61 determines whether a value of the 1 bit b9 among the 14 bits b0 to b13 forming the high rate binary stream is 0 or 1, and if it is determined that the value of the 1 bit b9 is 1, reverses the order of the four symbol values q4' to q7' obtained by the conversion.

In addition, if it is determined that the value of the 1 bit b9 is 0, the 14B8Q conversion unit 61 does not reverse the order of the four symbol values q4' to q7' obtained by the conversion.

Further, the 14B8Q conversion unit 61 performs the process described below according to the values of the 1 bit b11 among the 14 bits b0 to b13 forming the high rate binary stream.

That is to say, if the 1 bit b11 among the 14 bits b0 to b13 forming the high rate binary stream is 0, the 14B8Q conversion unit 61 reverses the respective signs of the four symbol values q4' to q7'. The 14B8Q conversion unit 61 obtains four symbol values q4 to q7 which are newly obtained through the reversal of the signs, as final conversion results.

Also, if the 1 bit b11 among the 14 bits b0 to b13 forming the high rate binary stream is 1, the 14B8Q conversion unit 61 does not reverse the respective signs of the four symbol values q4' to q7' and obtains the four symbol values q4' to q7' as q4 to q7 which are final conversion results.

In this way, the 14B8Q conversion unit 61 converts the 14 bits b0 to b13 into the eight symbol values q0 to q7 using the determined conversion table. In this case, when the table C is used as the conversion table, in the eight symbol values q0 to q7, the sum total of the four symbol values q0 to q3 is either 2 or −2.

Also, when the sum total of the four symbol values q0 to q3 is 2, the sum total of the four symbol values q4 to q7 is −2, and when the sum total of the four symbol values q0 to q3 is −2, the sum total of the four symbol values q4 to q7 is 2.

Therefore, the sum total of the eight symbol values q0 to q7 becomes 0. For this reason, a high rate symbol stream formed by the eight symbol values q0 to q7 does not include a DC component. This is the same as in the case of using the table D as the conversion table.

Referring to FIG. 4 again, in the 14B8Q conversion unit 61 the high rate symbol stream formed by the eight symbol values q0 to q7 obtained by the 14B8Q conversion are supplied to the binary stream conversion unit 62 and the superposition unit 67.

The binary stream conversion unit 62 stores in advance a conversion table used to convert the high rate binary stream from the 14B8Q conversion unit 61 into a binary stream for the FEC operation, in an internal memory (not shown). The binary stream for the FEC operation indicates binary values for generating 8-bit error correction information.

FIG. 12 shows an example of a conversion table stored in the binary stream conversion unit 62.

In the conversion table shown in FIG. 12, the respective values forming the high rate symbol stream are shown in the left column. Also, binary values obtained by the conversion of the symbol values are shown in the right column.

The binary stream conversion unit 62 converts each of the symbol values q0 to q7 forming the high rate binary stream from the 14B8Q conversion unit 61 into 2-bit binary values based on the conversion table, stored in advance, shown in FIG. 12, and, supplies 16-bit binary streams for the FEC operation obtained as a result thereof to the FEC operation unit 63.

The FEC operation unit 63 receives the 16-bit binary streams for the FEC operation from the binary stream conversion unit 62. The FEC operation unit 63 treats fifteen binary streams for the FEC operation, and performs the FEC operation by, for example, a BCH (248, 240) for the received fifteen binary streams (240 (=16×15)-bit binary streams for the FEC operation) for the FEC operation, and, supplies 8-bit error correction information obtained as a result thereof to the 8B6Q conversion unit 64.

The 8B6Q conversion unit 64 performs the 8B6Q conversion for the FEC binary symbol stream as the 8-bit error correction information from the FEC operation unit 63 so as to be converted into an FEC symbol stream formed by six symbol values, based on a conversion table stored in advance in an internal memory (not shown).

Next, FIG. 13 shows an example of the conversion table stored in advance in the 8B6Q conversion unit 64.

In the conversion table shown in FIG. 13, 4-bit binary streams are shown in the left column, and symbol streams formed by three symbol values obtained by converting the 4-bit binary streams are shown in the right column.

In the conversion table shown in FIG. 13, the sum total of the three symbol values obtained by the conversion becomes 0.

For example, the 8B6Q conversion unit 64 divides, as shown in FIG. 14, the bits b0 to b7 forming the FEC binary stream as the 8-bit error correction information from the FEC operation unit 63 into the lower 4 bits b0 to b3 and the higher 4 bits b4 to b7.

In addition, the 8B6Q conversion unit 64 converts the lower 4 bits b0 to b3 into three symbol values q0 to q2 and the higher 4 bits b4 to b7 into three symbol values q3 to q5, based on the conversion table, stored in advance, shown in FIG. 13.

The 8B6Q conversion unit 64 supplies the FEC symbol stream formed by the six symbol values q0 to q5 obtained by the 8B6Q conversion to the 2Q addition unit 66.

The 2B2Q conversion 65 is supplied with low rate data. The 2B2Q conversion 65 stores a conversion table as shown in FIG. 15 in an internal memory (not shown).

Next, FIG. 15 shows an example of the conversion table stored in advance in the 2B2Q conversion 65.

In the conversion table shown in FIG. 15, in the left column, 2-bit binary streams are shown, and, in the right column, symbol streams formed by two symbol values obtained by the conversion of the 2-bit binary streams are shown.

In the conversion table shown in FIG. 15, the sum total of the two symbol values obtained by the conversion becomes 0.

The 2B2Q conversion 65 divides a low rate binary stream formed by a plurality of bits indicating supplied low rate data into 2-bit low rate binary streams. The 2B2Q conversion 65 performs the 2B2Q conversion for the 2-bit low rate binary streams obtained by the division so as to be converted into low rate symbol streams formed by two symbol values, based on the conversion table, stored in advance, shown in FIG. 15.

The 2B2Q conversion 65 supplies the low rate symbol stream obtained by the 2B2Q conversion to the 2Q addition unit 66.

The 2Q addition unit 66 adds the low rate symbol stream formed by the two symbol values from the 2B2Q conversion 65 next to the FEC symbol stream formed by the six symbol values from the 8B6Q conversion unit 64, and supplies an FEC low rate symbol stream formed by eight symbol values obtained as a result thereof to the superposition unit 67.

The superposition unit 67 adds the FEC low rate symbol stream from the 2Q addition unit 66 next to the fifteen high rate symbol streams from the 14B8Q conversion unit 61, and generates a transmission signal formed by the fifteen high rate symbol streams and the FEC low rate symbol stream.

In addition, the superposition unit 67 superposes the generated transmission signal on a current from the power supply unit 68, and supplies the superposition signal obtained as a result thereof to a separation unit 81 of the receiving unit 42 via the power supply line.

In addition, the sum total of the eight symbol values forming each of the high rate symbol streams from the 14B8Q conversion unit 61 is 0. The FEC low rate symbol stream from the 2Q addition unit 66 is formed by the FEC symbol stream of which the sum total of the symbol values is 0 and the low rate symbol stream of which the sum total of the symbol values is 0.

For this reason, the superposition unit 67 supplies the transmission signal, not including a DC component, obtained by the superposition on the current as a power source to the separation unit 81 of the receiving unit 42 via the power supply line.

The power supply unit 68 is, for example, a battery or the like, and supplies a power to the 14B8Q conversion unit to the superposition unit 67. The power supply unit 68 supplies a current as the power to the superposition unit 67 in order to supply the power to the receiving unit 42.

The receiving unit 42 includes the separation unit 81, an inverse 8B6Q conversion unit 82, an inverse 14B8Q conversion unit 83, an error correction unit 84, an inverse 2B2Q conversion unit 85, and a signal processing unit 86.

The separation unit 81 receives the superposition signal from the superposition unit 67 and separates the received superposition signal into the current and the transmission signal using various kinds of filters. The separation unit 81 supplies the separated current to the inverse 8B6Q conversion unit 82, the inverse 14B8Q conversion unit 83, the error correction unit 84, the inverse 2B2Q conversion unit 85, and the signal processing unit 86, as the power.

In addition, the separation unit 81 extracts the fifteen high rate symbol streams from the transmission signal based on the number of the respective symbol values forming the transmission signal obtained by the separation so as to be supplied to the inverse 14B8Q conversion unit 83.

Specifically, for example, the separation unit 81 extracts the first (head) symbol value to the 120th (=8×15) symbol value from the respective symbol values forming the transmission signal obtained by the separation, as the fifteen high rate symbol streams, so as to be supplied to the inverse 14B8Q conversion unit 83.

The separation unit 81 extracts the six symbol values from the head as the FEC symbol stream and extracts the remaining two symbol values as the low rate symbol stream, from the eight symbol values forming the FEC low rate symbol stream included in the transmission signal, based on the number of the respective symbol values forming the transmission signal which is obtained by the separation.

Specifically, for example, the separation unit 81 extracts the 121st symbol value to the 126th symbol value as the FEC symbol stream and extracts the 127th and 128th symbol values as the low rate symbol stream from the respective symbol values forming the transmission signal obtained by the separation.

The separation unit 81 supplies the extracted FEC symbol stream to the inverse 8B6Q conversion unit 82 and supplies the extracted low rate symbol stream to the inverse 2B2Q conversion unit 85.

In the first embodiment, in a case where the superposition unit 67 of the transmitting unit 41 transmits the transmission signal to the receiving unit 42 via the signal line, the separation unit 81 of the receiving unit 42 receives the transmission signal which is transmitted from the superposition unit 67 via the signal line.

In this case, the separation unit 81 performs the same process for the transmission signal separated from the superposition signal, and extracts the fifteen high rate symbol streams, the FEC symbol stream, and the low rate symbol stream from the received transmission signal. Further, the separation unit 81 supplies the extracted fifteen high rate symbol streams to the inverse 14B8Q conversion unit 83, the extracted FEC symbol stream to the inverse 8B6Q conversion unit 82, and the extracted low rate symbol stream to the inverse 2B2Q conversion unit 85, respectively.

The inverse 8B6Q conversion unit 82 performs conversion (inverse 8B6Q conversion) reverse to the 8B6Q conversion performed by the 8B6Q conversion unit 64 for the six symbol values forming the FEC symbol stream from the separation unit 81.

In other words, for example, the inverse 8B6Q conversion unit 82 stores in advance the same conversion table (FIG. 13) as stored in the 8B6Q conversion unit 64, in an internal memory (not shown). The inverse 8B6Q conversion unit performs the inverse 8B6Q conversion for the FEC symbol stream from the separation unit 81 so as to be converted into a corresponding 8-bit FEC binary stream based on the conversion table which is stored in advance.

Through the inverse 8B6Q conversion, the FEC symbol stream formed by the six symbol values from the separation unit 81 is converted into the 8-bit FEC binary stream, that is, the 8-bit error correction information generated by the FEC operation unit 63.

The inverse 8B6Q conversion unit 82 supplies the 8-bit error correction information obtained by the inverse 8B6Q conversion to the error correction unit 84.

The inverse 14B8Q conversion unit 83 stores in advance the same conversion tables (the tables A, B, C and D) as stored in the 14B8Q conversion unit 61 in an internal memory (not shown).

The inverse 14B8Q conversion unit 83 performs conversion (inverse 14B8Q conversion) reverse to the 14B8Q conversion performed by the 14B8Q conversion unit 61 for each of the fifteen high rate symbol streams from the separation unit 81 based on the conversion tables which are stored in advance.

In other words, for example, the inverse 14B8Q conversion unit 83 calculates an additional absolute value for either the first half of the four symbol values or the second half of the four symbol values among the eight symbol values forming the high rate symbol stream from the separation unit 81, and determines the conversion table used for the inverse 14B8Q conversion based on the additional absolute value obtained by the calculation.

Specifically, for example, when eight symbol values (−2, −1, 1, 2, −2, −1, 2, 1) forming the high rate symbol stream are supplied from the separation unit 81, the inverse 14B8Q conversion unit 83 calculates an additional absolute value 0 (=|−2−1+1+2|) obtained by summing, for example, the first half of the four symbol values (−2, −1, 1, 2) among the eight symbol values (−2, −1, 1, 2, −2, −1, 2, 1) forming the high rate symbol stream from the separation unit 81.

The inverse 14B8Q conversion unit 83 determines the conversion table used for the inverse 14B8Q conversion based on the calculated additional absolute value. That is to say, if the additional absolute value is 0, the inverse 14B8Q conversion unit 83 determines the table A, and if the additional absolute value is 1, the inverse 14B8Q conversion unit 83 determines the table B. In addition, for example, if the additional absolute value is 2, the inverse 14B8Q conversion unit 83 determines the table C, and if the additional absolute value is 3, the inverse 14B8Q conversion unit 83 determines the table D.

Inverse 14B8Q Conversion Using Table A

Next, the inverse 14B8Q conversion performed when the inverse 14B8Q conversion unit 83 determines the table A as a conversion table will be described.

Since the inverse 14B8Q conversion unit 83 determines that the additional absolute value is 0 and determines the table A as a conversion table, the higher 2 bits b13 and b12 among the 14 bits b0 to b13 forming the high rate symbol stream which is the conversion result of the inverse 14B8Q conversion is set to "00".

The inverse 14B8Q conversion unit 83 sets the 12 bits b0 to b11 among the 14 bits b0 to b13 forming the high rate binary stream based on the table A stored in advance.

In other words, for example, if the lower four symbol values q0 to q3 among the eight symbol values q0 to q7 forming the high rate symbol stream from the separation unit 81 are included in the table A, the inverse 14B8Q conversion unit 83 sets the 1 bit b5 among the 14 bits b0 to b13 forming the high rate binary stream to "0".

The inverse 14B8Q conversion unit 83 converts the lower four symbol values q0 to q3 into corresponding 5 bits based on the table A stored in advance, and sets the conversion result as 5 bits b0 to b4.

In addition, for example, if the lower four symbol values q0 to q3 among the eight symbol values q0 to q7 forming the high rate symbol stream from the separation unit 81 are not included in the table A, the inverse 14B8Q conversion unit 83 changes the lower four symbol values q0 to q3 to the same four symbol values as included in the table A.

In other words, for example, the inverse 14B8Q conversion unit 83 reverses the signs of the lower four symbol values q0 to q3 and changes them to the same four symbol values as included in the table A. The inverse 14B8Q conversion unit 83 converts the changed lower four symbol values q0 to q3 into corresponding 5 bits based on the table A stored in advance, and sets the conversion result as 5 bits b0 to b4. In addition, the inverse 14B8Q conversion unit 83 sets the 1 bit b5 to "1" so as to correspond to the reversal of the signs of the lower four symbol values q0 to q3.

The inverse 14B8Q conversion unit 83 performs the same process as the process performed for the lower four symbol values q0 to q3 for the higher four symbol values q4 to q7, and sets 6 bits b6 to b11.

Inverse 14B8Q Conversion Using Table B

The inverse 14B8Q conversion performed when the inverse 14B8Q conversion unit 83 determines the table B as a conversion table will be described.

The inverse 14B8Q conversion unit 83 sets the 14 bits b0 to b13 forming the high rate binary stream based on the table B stored in advance.

In other words, for example, if the lower four symbol values q0 to q3 among the eight symbol values q0 to q7 forming the high rate symbol stream from the separation unit 81 are included in the table B, the inverse 14B8Q conversion unit 83 sets the higher 2 bits b13 and b12 among the 14 bits b0 to b13 forming the high rate binary stream to "10" and sets the 1 bit b5 to "0".

The inverse 14B8Q conversion unit 83 converts the lower four symbol values q0 to q3 into corresponding 5 bits based on the table B stored in advance, and sets the conversion result as 5 bits b0 to b4.

In addition, for example, if the lower four symbol values q0 to q3 among the eight symbol values q0 to q7 forming the high rate symbol stream from the separation unit 81 are not included in the table B, the inverse 14B8Q conversion unit 83 changes the lower four symbol values q0 to q3 to the same four symbol values as included in the table B.

In other words, for example, the inverse 14B8Q conversion unit 83 reverses either the signs or the order of the lower four symbol values q0 to q3 and changes them to the same four symbol values as included in the table B. The inverse 14B8Q conversion unit 83 converts the changed lower four symbol values q0 to q3 into corresponding 5 bits based on the table B stored in advance, and sets the conversion result as 5 bits b0 to b4.

In addition, when the signs of the lower four symbol values q0 to q3 are reversed, the inverse 14B8Q conversion unit 83 sets the higher 2 bits b13 and b12 to "01", and when the signs thereof are not reversed, the inverse 14B8Q conversion unit 83 sets the higher 2 bits b13 and b12 to "10".

In addition, when the order of the lower four symbol values q0 to q3 is revered, the inverse 14B8Q conversion unit 83 sets the 1 bit b5 to "1", and, when the order thereof is not reversed, the inverse 14B8Q conversion unit 83 sets the 1 bit b5 to "0".

The inverse 14B8Q conversion unit 83 performs the same process as the process performed for the lower four symbol values q0 to q3 for the higher four symbol values q4 to q7, and sets 6 bits b6 to b11.

Inverse 14B8Q Conversion Using Table C

The inverse 14B8Q conversion performed when the inverse 14B8Q conversion unit 83 determines the table C as a conversion table will be described.

Since the inverse 14B8Q conversion unit 83 determines that the additional absolute value is 2 and determines the table C as a conversion table, the higher 2 bits b13 and b12 among the 14 bits b0 to b13 forming the high rate symbol stream which is the conversion result of the inverse 14B8Q conversion is set to "11" and sets the 1 bit b10 to "0".

The inverse 14B8Q conversion unit 83 sets the remaining 1 bit b11 and 10 bits b0 to b9 among the 14 bits b0 to b13 forming the high rate binary stream based on the table C stored in advance.

In other words, for example, if the lower four symbol values q0 to q3 among the eight symbol values q0 to q7 forming the high rate symbol stream from the separation unit 81 are included in the table C, the inverse 14B8Q conversion unit 83 sets the 1 bit b11 and the 1 bit b4 among the 14 bits b0 to b13 forming the high rate binary stream to "0" and "0", respectively.

The inverse 14B8Q conversion unit 83 converts the lower four symbol values q0 to q3 into corresponding 4 bits based on the table C stored in advance, and sets the conversion result as 4 bits b0 to b3.

In addition, for example, if the lower four symbol values q0 to q3 among the eight symbol values q0 to q7 forming the high rate symbol stream from the separation unit 81 are not included in the table C, the inverse 14B8Q conversion unit 83 changes the lower four symbol values q0 to q3 to the same four symbol values as included in the table C.

In other words, for example, the inverse 14B8Q conversion unit 83 reverses either the signs or the order of the lower four symbol values q0 to q3 and changes them to the same four symbol values as included in the table C. The inverse 14B8Q conversion unit 83 converts the changed lower four symbol values q0 to q3 into corresponding 4 bits based on the table C stored in advance, and sets the conversion result as 4 bits b0 to b3.

In addition, when the signs of the lower four symbol values q0 to q3 are reversed, the inverse 14B8Q conversion unit 83 sets the 1 bit b11 to "1", and when the signs thereof are not reversed, the inverse 14B8Q conversion unit 83 sets the 1 bit b11 to "0".

In addition, when the order of the lower four symbol values q0 to q3 is revered, the inverse 14B8Q conversion unit 83 sets the 1 bit b4 to "1", and, when the order thereof is not reversed, the inverse 14B8Q conversion unit 83 sets the 1 bit b4 to "0".

The inverse 14B8Q conversion unit 83 performs the same process as the process performed for the lower four symbol values q0 to q3 for the higher four symbol values q4 to q7, and sets 5 bits b5 to b9.

Inverse 14B8Q Conversion Using Table D

The inverse 14B8Q conversion performed when the inverse 14B8Q conversion unit 83 determines the table D as a conversion table will be described.

Since the inverse 14B8Q conversion unit 83 determines that the additional absolute value is 3 and determines the table D as a conversion table, the higher 2 bits b13 and b12 among the 14 bits b0 to b13 forming the high rate symbol stream which is the conversion result of the inverse 14B8Q conversion is set to "11" and sets the 1 bit b10 to "1".

In the same manner as the case of determining the table C as a conversion table, the inverse 14B8Q conversion unit 83 sets the remaining 1 bit b11 and 10 bits b0 to b9 among the 14 bits b0 to b13 forming the high rate binary stream based on the table D stored in advance.

In this way, the inverse 14B8Q conversion unit 83 performs the inverse 14B8Q conversion for the eight symbol values q0 to q7 forming the high rate symbol stream from the separation unit 81. The inverse 14B8Q conversion unit 83 supplies the high rate binary stream formed by the 14 bits b0 to b13 obtained as a result thereof to the error correction unit 84.

Thereby, the inverse 14B8Q conversion unit 83 supplies the fifteen high rate binary streams to the error correction unit 84.

The error correction unit 84 receives the fifteen high rate binary streams from the inverse 14B8Q conversion unit 83 as high rate data.

The error correction unit 84 performs error correction for the received high rate data based on the error correction information from the inverse 8B6Q conversion unit 82, and supplies the high rate data having undergone the error correction to the signal processing unit 86.

The inverse 2B2Q conversion unit 85 stores in advance the same conversion table (FIG. 15) as stored in the 2B2Q conversion 65, in an internal memory (not shown).

The inverse 2B2Q conversion unit 85 performs conversion reverse to the 2B2Q conversion (inverse 2B2Q conversion) performed by the 2B2Q conversion 65 for the low rate symbol stream formed by the two symbol values from the separation unit 81, based on the conversion table stored in advance.

The inverse 2B2Q conversion unit 85 supplies the 2-bit low rate binary stream, that is, low rate data obtained by the inverse 2B2Q conversion to the signal processing unit 86.

The signal processing unit 86 performs a predetermined process based on the high rate data from the error correction unit 84 and the low rate data from the inverse 2B2Q conversion unit 85. In other words, for example, if the high rate data from the error correction unit 84 or the low rate data from the inverse 2B2Q conversion unit 85 is a video signal, the signal processing unit 86 displays images corresponding to the video signal on the display (not shown).

Description of Operation of Transmitting Unit 41

Next, with reference to the flowchart in FIG. 16, the data transmission process performed by the transmitting unit 41 will be described.

The data transmission process starts, for example, when the high rate data is supplied to the 14B8Q conversion unit 61 and the low rate data is supplied to the 2B2Q conversion 65, respectively, and the like, as data for being supplied to the receiving unit 42.

In step S21, the 14B8Q conversion unit 61 divides the high rate binary stream formed by a plurality of bits indicating the supplied high rate data into 14-bit high rate binary streams, and performs the 14B8Q conversion for each of the 14-bit high rate binary streams obtained by the division so as to be converted into the eight symbol values.

In addition, in the 14B8Q conversion unit 61 the high rate symbol stream formed by the eight symbol values q0 to q7 obtained by the 14B8Q conversion is supplied to the binary stream conversion unit 62 and the superposition unit 67.

In step S22, the binary stream conversion unit 62 converts each of the symbol values q0 to q7 forming the high rate symbol stream from the 14B8Q conversion unit 61 to 2 bits binary values based on the conversion table, stored in advance, as shown in FIG. 12, and supplies the 16-bit binary stream for the FEC operation obtained as a result thereof to the FEC operation unit 63.

In step S23, the FEC operation unit 63 performs the FEC operation by, for example, a BCH (248, 240) for the fifteen binary streams (240 (=16×15)-bit binary streams for the FEC operation) for the FEC operation each time the fifteen binary streams for the FEC operation are supplied as the 16-bit binary stream for the FEC operation from the binary stream conversion unit 62, and, supplies 8-bit error correction information obtained as a result thereof to the 8B6Q conversion unit 64.

In step S24, the 8B6Q conversion unit 64 performs the 8B6Q conversion for the FEC binary stream as the 8-bit error correction information from the FEC operation unit 63 so as to be converted into an FEC symbol stream formed by six symbol values, based on the conversion table (FIG. 13) stored in advance in an internal memory (not shown).

The 8B6Q conversion unit 64 supplies the FEC symbol stream formed by the six symbol values obtained by the 8B6Q conversion to the 2Q addition unit 66.

In step S25, the 2B2Q conversion 65 divides a low rate binary stream formed by a plurality of bits indicating supplied low rate data into 2-bit low rate binary streams. The 2B2Q conversion 65 performs the 2B2Q conversion for the 2-bit low rate binary streams obtained by the division so as to be converted into low rate symbol streams formed by two symbol values, based on the conversion table, stored in advance, shown in FIG. 15.

The 2B2Q conversion 65 supplies the low rate symbol stream formed by the two symbol values obtained by the 2B2Q conversion to the 2Q addition unit 66.

In step S26, the 2Q addition unit 66 adds the low rate symbol stream formed by the two symbol values from the 2B2Q conversion 65 next to the FEC symbol stream formed by the six symbol values from the 8B6Q conversion unit 64, and supplies an FEC low rate symbol stream formed by eight symbol values obtained as a result thereof to the superposition unit 67.

In step S27, the superposition unit 67 adds the FEC low rate symbol stream from the 2Q addition unit 66 next to the fifteen high rate symbol streams from the 14B8Q conversion unit 61, and generates a transmission signal formed by the fifteen high rate symbol streams and the FEC low rate symbol stream.

In addition, the superposition unit 67 superposes the generated transmission signal on a current from the power supply unit 68.

In step S28, the superposition unit 67 supplies the superposition signal obtained as a result of the superposition to the separation unit 81 of the receiving unit 42 via the power supply line. In this way, the data transmission process is finished.

Description of Operation of Receiving Unit 42

Figure 17:
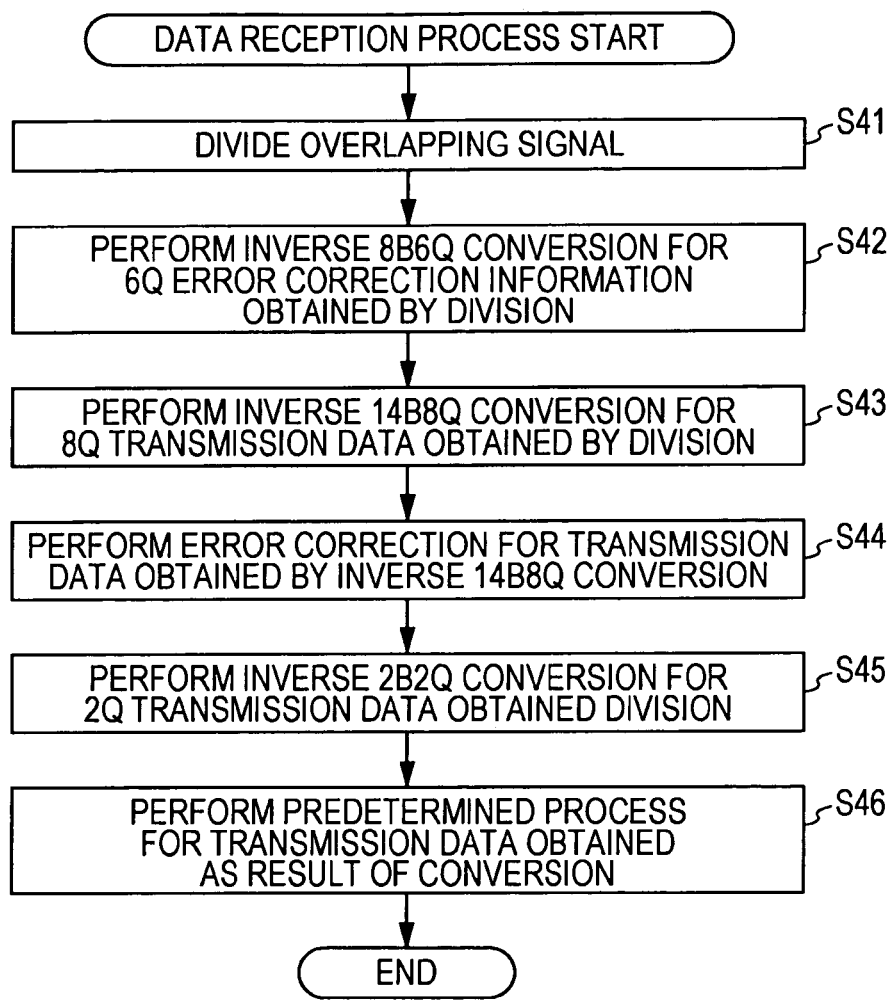
FIG. 17 is a flowchart illustrating a data receiving process performed by a receiving unit.

Next, with reference to the flowchart in FIG. 17, the data reception process performed by the receiving unit 42 will be described.

The data reception process starts, for example, when the superposition signal is supplied from the transmitting unit 41 via the power supply line.

In step S41, the separation unit 81 receives the superposition signal from the superposition unit 67 and separates the received superposition signal into the current and the transmission signal using various kinds of filters. The separation unit 81 supplies the separated current to the inverse 8B6Q conversion unit 82, the inverse 14B8Q conversion unit 83, the error correction unit 84, the inverse 2B2Q conversion unit 85, and the signal processing unit 86, as the power.

In addition, the separation unit 81 extracts the fifteen high rate symbol streams from the transmission signal based on the number of the respective symbol values forming the transmission signal obtained by the separation so as to be supplied to the inverse 14B8Q conversion unit 83.

The separation unit 81 extracts the six symbol values from the head as the FEC symbol stream and extracts the remaining two symbol values as the low rate symbol stream, from the eight symbol values forming the FEC low rate symbol stream included in the transmission signal, based on the number of the respective symbol values forming the transmission signal which is obtained by the separation.

The separation unit 81 supplies the extracted FEC symbol stream to the inverse 8B6Q conversion unit 82 and supplies the extracted low rate symbol stream to the inverse 2B2Q conversion unit 85.

In step S42, the inverse 8B6Q conversion unit 82 performs the inverse 8B6Q conversion for the FEC symbol stream formed by the six symbol values from the separation unit 81 and supplies the 8-bit error correction information obtained by the inverse 8B6Q conversion to the error correction unit 84.

In step S43, the inverse 14B8Q conversion unit 83 performs the inverse 14B8Q conversion for each of the fifteen high rate symbol streams from the separation unit 81 based on the conversion tables which are stored in advance, and supplies the high rate binary stream formed by the 14 bits b0 to b13 obtained by the inverse 14B8Q conversion to the error correction unit 84.

In step S44, the error correction unit 84 receives fifteen high rate binary streams as high rate data, in the 14-bit high rate binary stream which is sequentially supplied from the inverse 14B8Q conversion unit 83.

The error correction unit 84 performs error correction for the received high rate data based on the error correction information from the inverse 8B6Q conversion unit 82, and supplies the high rate data having undergone the error correction to the signal processing unit 86.

In step S45, the inverse 2B2Q conversion unit 85 performs the inverse 2B2Q conversion for the low rate symbol stream formed by the two symbol values from the separation unit 81, based on the conversion table stored in advance, and supplies the 2-bit low rate binary stream, that is, low rate data obtained by the inverse 2B2Q conversion to the signal processing unit 86.

In step S46, the signal processing unit 86 performs a predetermined process based on the high rate data from the error correction unit 84 and the low rate data from the inverse 2B2Q conversion unit 85. In this way, the data reception process is finished.

As described above, in the data transmission process, the transmission signal formed by the high rate symbol stream and the FEC low rate symbol stream is generated such that the sum total of the respective symbol values forming the high rate symbol stream becomes 0 and the sum total of the respective symbol values forming the FEC low rate symbol stream becomes 0, and thus it is possible to generate the transmission signal which does not include a DC component.

For this reason, in the data transmission process, when the superposition signal obtained by superposing the transmission signal on the current is transmitted to the receiving unit 42 via the power supply line, it is possible to easily separate the received superposition signal into the transmission signal and the current using various kinds of filters in the data reception process.

Therefore, since the transmission signal as well as the current as the power can be transmitted via a single power supply line, it is possible to reduce the number of signal lines as compared with a case of supplying only the current as the power via the power supply line.

In addition, for example, in the data transmission process, the FEC low rate symbol stream including the FEC symbol stream and the low rate symbol stream is transmitted. Therefore, even if an error occurs in the high rate symbol stream during the transmission of the high rate symbol stream, it is possible to correct high rate data corresponding to the high rate symbol stream where the error (an error in which each of the symbol values forming the symbol stream varies by 1) occurs, based on the error correction information corresponding to the FEC symbol stream, in the data reception process.

In addition, for example, in the data transmission process, since the FEC low rate symbol stream including the FEC symbol stream and the low rate symbol stream is transmitted, it is possible to transmit data more efficiently than the case of transmitting the FEC symbol stream along with padding data.

In the data transmission process, since the transmission signal formed by the symbol values is transmitted, it is possible to transmit more data without the increase in the clock frequency in the transmitting unit 41 and the receiving unit 42.

In the first embodiment, as shown in FIG. 3, although the error correction information regarding the fifteen high rate symbol streams ("8Qui" shown in FIG. 3) corresponding to the high rate data is generated and added, error correction information regarding the low rate symbol stream ("2Qui" low rate shown in FIG. 3) corresponding to the low rate data may be generated and added.

Figure 18:
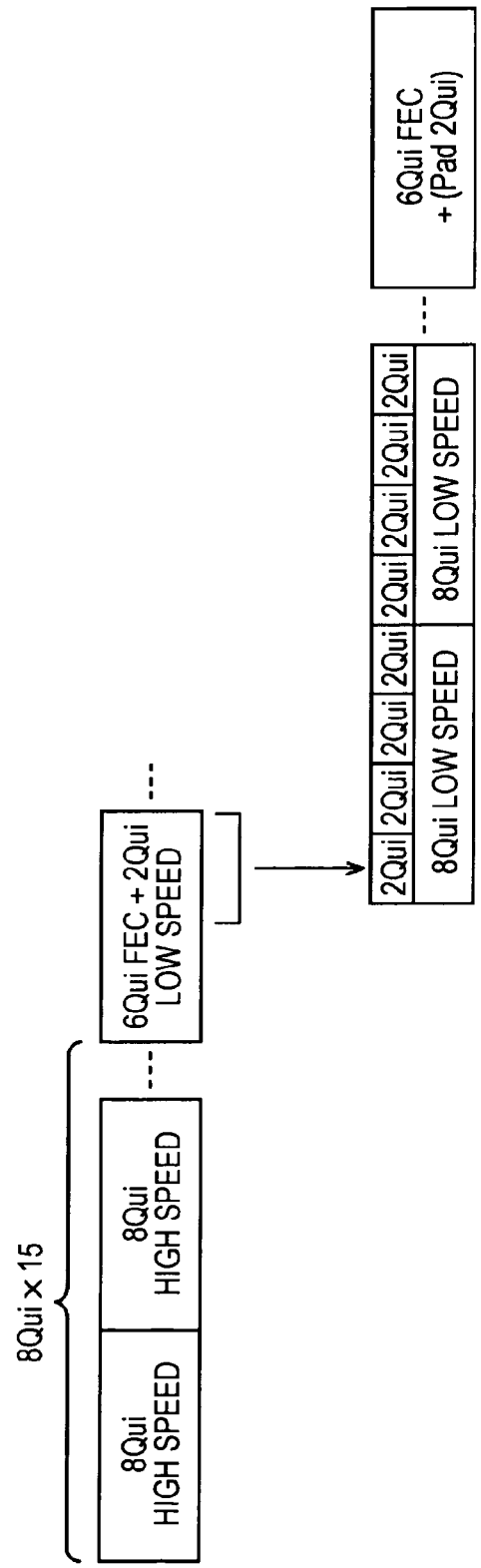
FIG. 18 is a diagram illustrating a modified example of the first embodiment.

That is to say, as shown in FIG. 18, the low rate symbol stream is formed by eight symbol values which include four low rate symbol streams each of which is formed by two symbol values as one set.

In the same manner as the case of generating the error correction information corresponding to fifteen high rate symbol streams when the fifteen high rate symbol streams each of which is formed by eight symbol values form one set, there may be a generation of error correction information corresponding to fifteen low rate symbol streams (each of which is formed by eight symbol values) when the fifteen low rate symbol streams each of which is formed by the eight symbol values form one set.

In this case, the error correction information is added to not only the high rate data but also the low rate data, and thus it is possible to also correct an error occurring in the low rate data.

In addition, the error correction information regarding the fifteen low rate symbol streams is converted into a low rate FEC symbol stream formed by six symbol values in the same manner as the case of the error correction information regarding the fifteen high rate symbol streams.

In addition, for example, a symbol stream formed by two symbol values corresponding to padding data is added to the low rate FEC symbol stream and then is transmitted as symbol values including eight symbol values.

Instead of adding the symbol stream corresponding to the padding data to the low rate FEC symbol stream, a low rate symbol stream formed by two symbol values may be added. In this case, it is possible to transmit data more efficiently than the case of adding the symbol stream corresponding to the padding data.

In the first embodiment, the high rate binary stream is converted into a plurality of high rate symbol streams using the 14B8Q conversion, but the present invention is not limited thereto, for example, 12B8Q (quartenary) conversion may be used in which 12 bits are converted into eight symbol values.

3. Second Embodiment

Next, with reference to FIGS. 19 to 32, a second embodiment will be described in which a transmission signal is generated using 12B8Q conversion.

Figure 19:
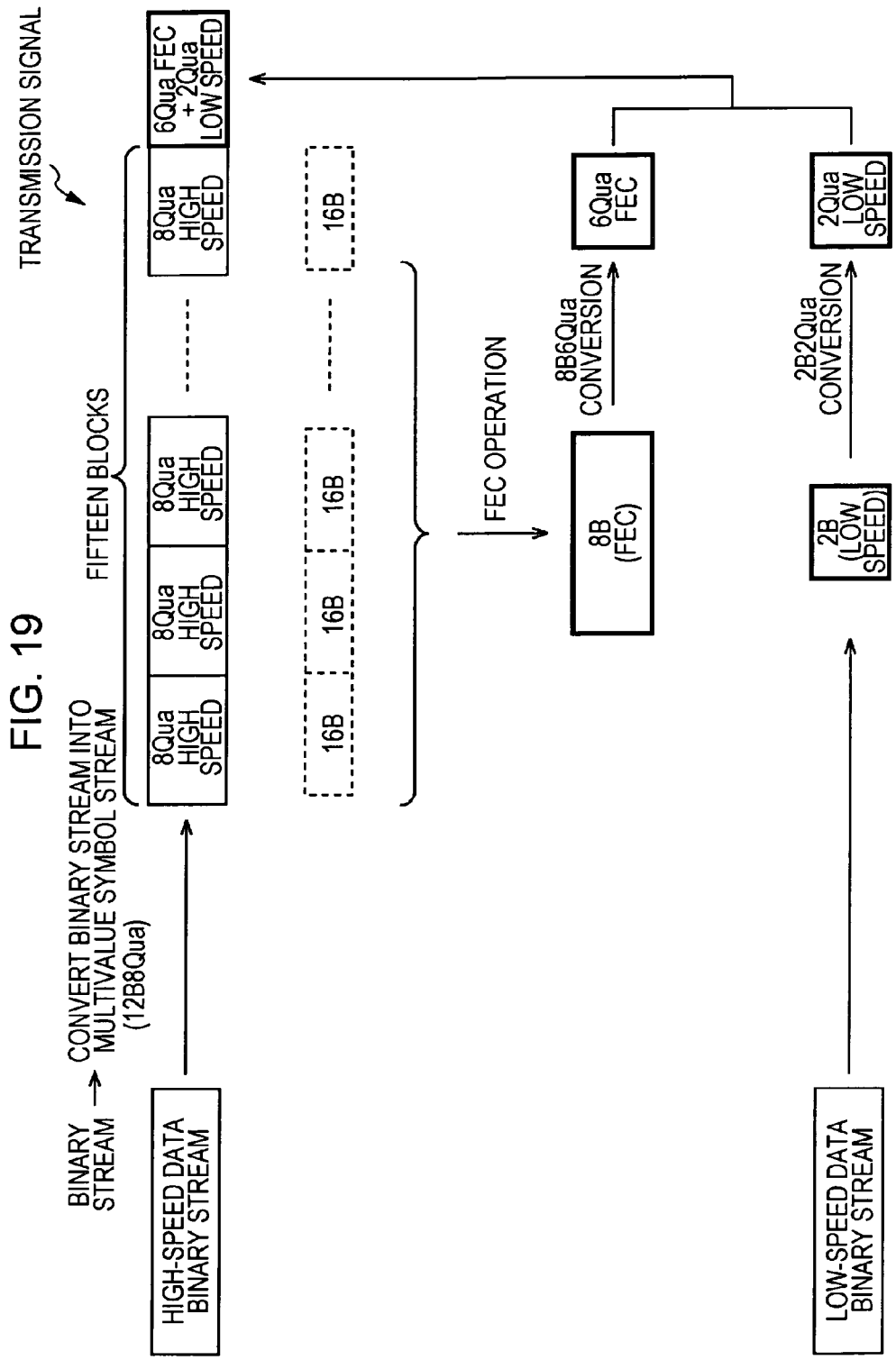
FIG. 19 is a first diagram illustrating an outline of a second embodiment.
Figure 20:
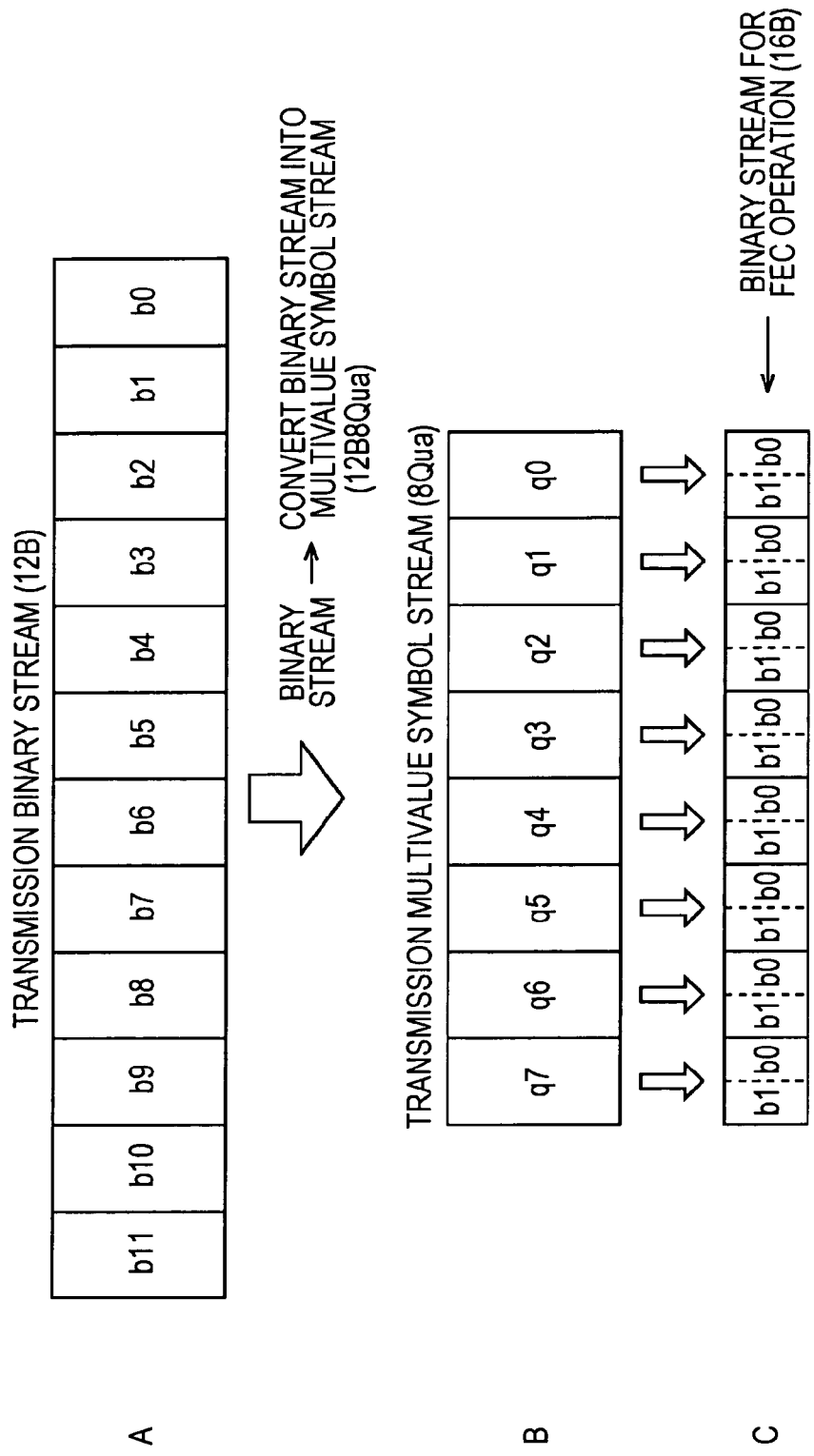
FIG. 20 is a second diagram illustrating an outline of the second embodiment.

FIGS. 19 and 20 show an outline of the second embodiment.

As shown in FIG. 19, the second embodiment is considerably different from the first embodiment in that the 12B8Q conversion is used instead of the 14B8Q conversion.

In addition, as shown in FIG. 20, the 12B8Q conversion is performed for a high rate binary stream (A of FIG. 20) formed by 12 bits b0 to b11, and a high rate symbol stream formed by eight symbol values q0 to q7 is obtained by the 12B8Q conversion.

In addition, for example, a process and the like for generating a binary stream for the FEC operation based on the high rate symbol stream formed by the eight symbol values q0 to q7 are performed in the same manner as the case of the first embodiment.

Next, with reference to FIGS. 21 to 24, conversion tables used for the 12B8Q conversion will be described.

FIG. 21 shows a table A used when the higher 2 bits among the respective bits forming the 12-bit high rate binary stream are "00".

In the table A shown in FIG. 21, binary streams each of which is formed by 4 bits are shown in the first column from the left. In the second to fourth columns from the left, symbol streams each of which is formed by four symbol values obtained by converting the binary stream written in the first column from the left are shown. This is the same as in FIGS. 22 to 24 described later.

In the table A shown in FIG. 21, the sum total of four symbol values obtained by the conversion becomes 0.

FIG. 22 shows the table B used when the higher 2 bits among the respective bits forming the 12-bit high rate binary stream are either "01" or "10".

In the table B shown in FIG. 22, the sum total of four symbol values obtained by the conversion becomes 1.

FIGS. 23 and 24 show the tables C and D used when the higher 2 bits among the respective bits forming the 12-bit high rate binary stream are "11".

In the table C shown in FIG. 23, the sum total of four symbol values obtained by the conversion becomes 2.

In the table D shown in FIG. 24, the sum total of four symbol values obtained by the conversion becomes 3.

Figure 25:
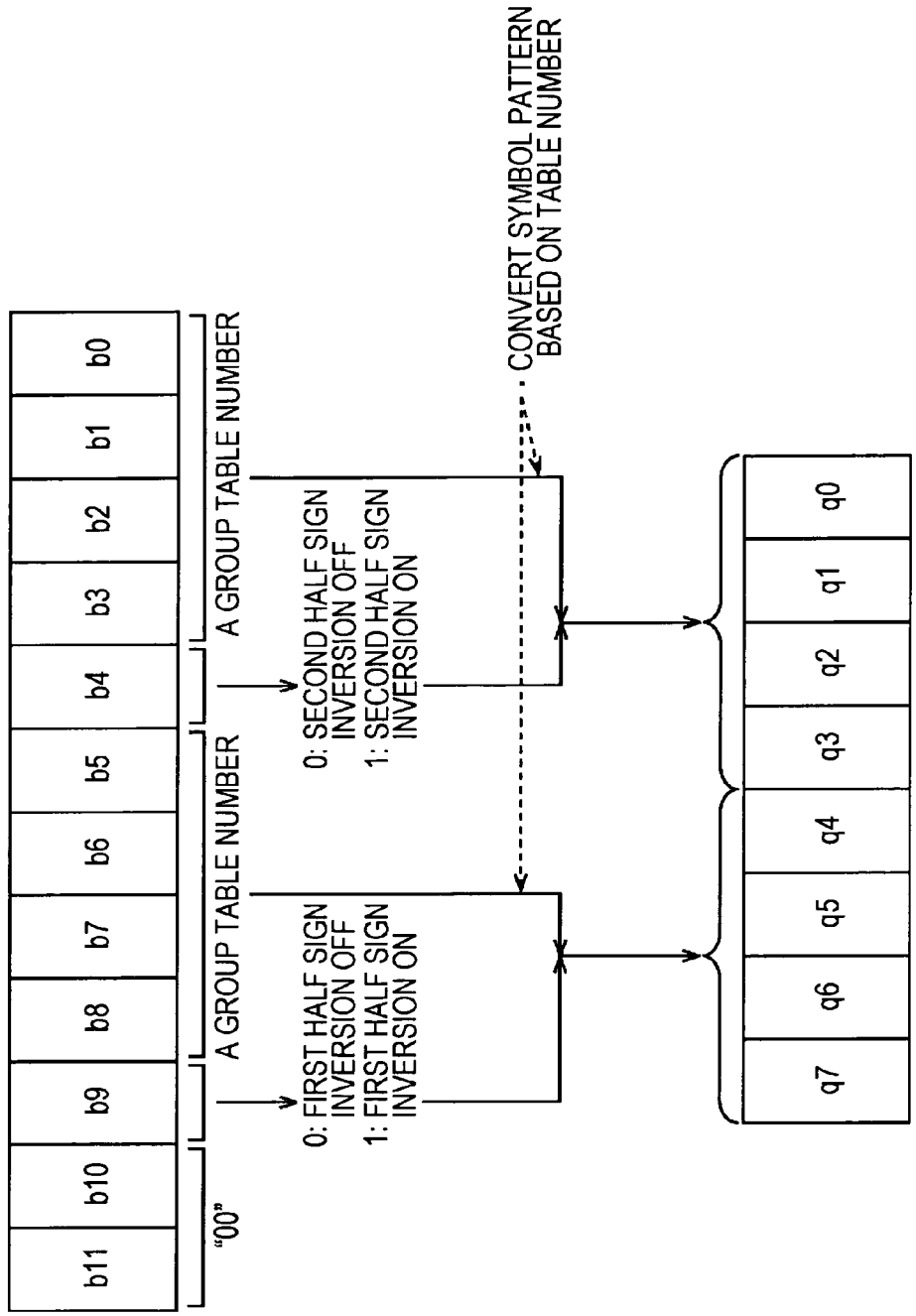
FIG. 25 is a diagram illustrating an example of the 12B8Q conversion using the table A in FIG. 21.
Figure 26:
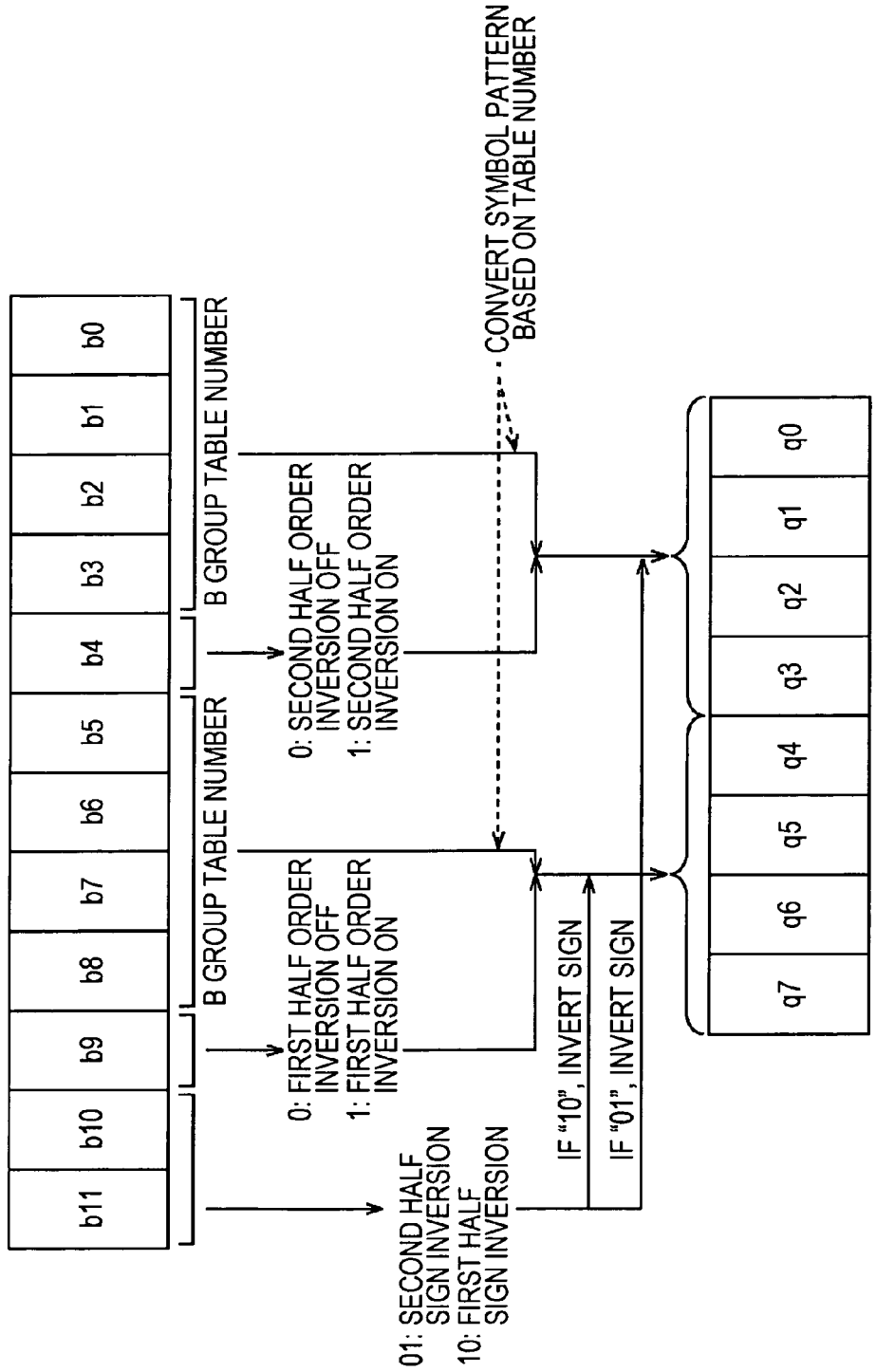
FIG. 26 is a diagram illustrating an example of the 12B8Q conversion using the table B in FIG. 22.
Figure 27:
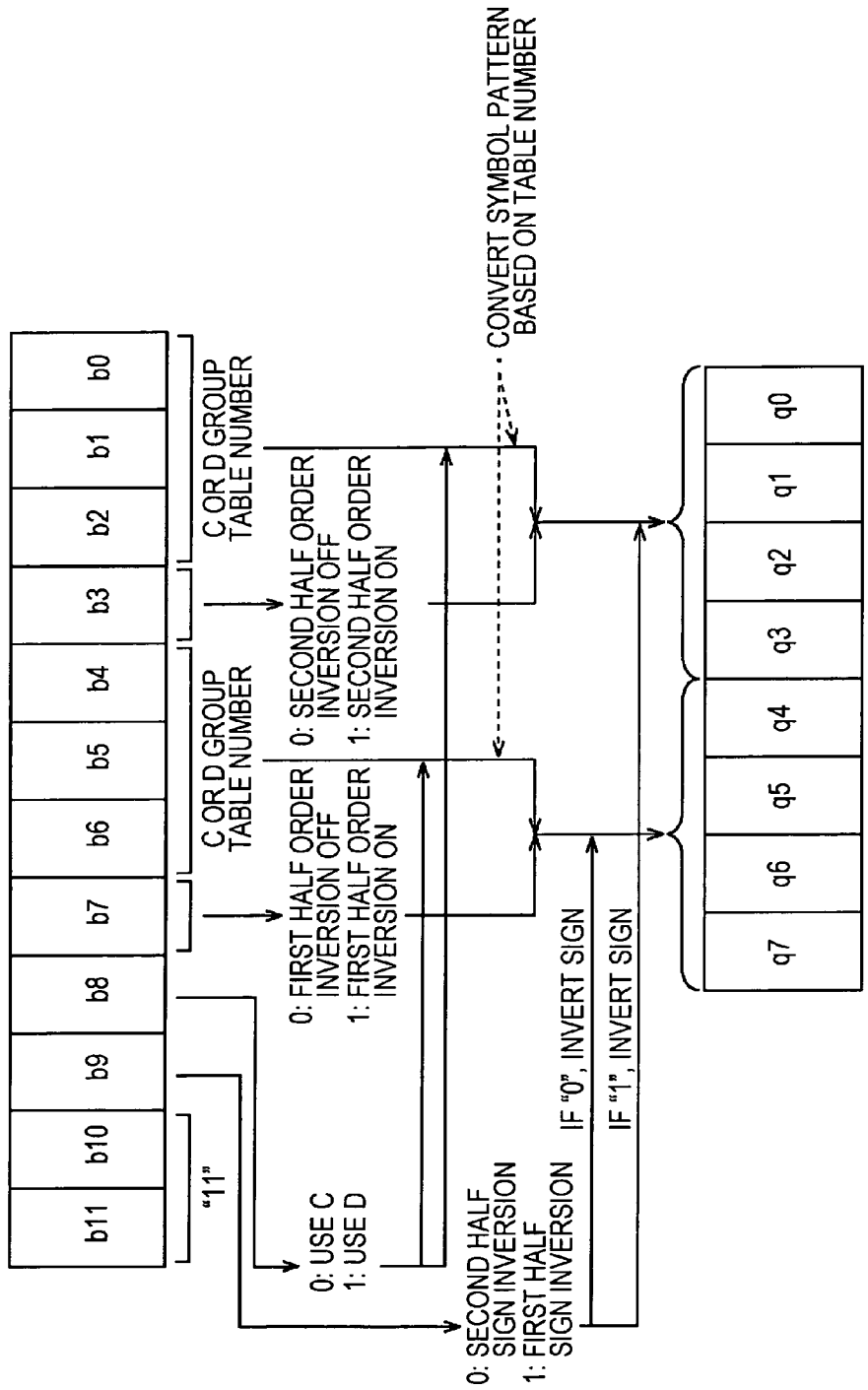
FIG. 27 is a diagram illustrating an example of the 12B8Q conversion using the table C in FIG. 23 or the table D in FIG. 24.

With reference to FIGS. 25 to 27, the 12B8Q conversion using the table A in FIG. 21, the 12B8Q conversion using the table B in FIG. 22, and the 12B8Q conversion using either the table C in FIG. 23 or the table D in FIG. 24, will be described.

FIG. 25 shows details of the 12B8Q conversion using the table A in FIG. 21, which is performed when the higher 2 bits among the respective bits forming the 12-bit binary stream are "00".

In the second embodiment, as shown in FIG. 25, a process is performed in the same manner as the case described with reference to FIG. 9. In other words, in the second embodiment, the process which is the same as in the case described with reference to FIG. 9 is performed except that a conversion target of the 12B8Q conversion is a binary stream formed by the 12 bits b0 to b11, and the table A shown in FIG. 21 is used.

Next, FIG. 26 shows details of the 12B8Q conversion using the table B in FIG. 22, which is performed when the higher 2 bits among the respective bits forming the 12-bit binary stream are either "01" or "10".

In the second embodiment, as shown in FIG. 26, a process is performed in the same manner as the case described with reference to FIG. 10. In other words, in the second embodiment, the process which is the same as in the case described with reference to FIG. 10 is performed except that a conversion target of the 12B8Q conversion is a high rate binary stream formed by the 12 bits b0 to b11, and the table B shown in FIG. 22 is used.

Next, FIG. 27 shows details of the 12B8Q conversion using the table C in FIG. 23 or the table D in FIG. 24, which is performed when the higher 2 bits among the respective bits forming the 12-bit high rate binary stream are "11".

In the second embodiment, as shown in FIG. 27, a process is performed in the same manner as the case described with reference to FIG. 11. In other words, in the second embodiment, the process which is the same as in the case described with reference to FIG. 11 is performed except that a conversion target of the 12B8Q conversion is a high rate binary stream formed by the 12 bits b0 to b11, and the table C shown in FIG. 23 or the table D shown in FIG. 24 is used.

In the second embodiment, as described with reference to FIGS. 25 to 27, the 12B8Q conversion is performed for the 12-bit high rate binary stream which is high rate data, and fifteen high rate symbol streams (fifteen "8Qua high rate" shown in FIG. 19) corresponding to the high rate data are generated.

FIG. 28 shows an example of a conversion table used when the fifteen high rate symbol streams are converted into 240-bit binary streams for the FEC operation. Also, this conversion table corresponds to the conversion table shown in FIG. 12 in the first embodiment.

In the second embodiment, using the conversion table as shown in FIG. 28, the fifteen high rate symbol streams (fifteen "8Qua high rate" shown in FIG. 19) are converted into the 240-bit binary streams for the FEC operation (fifteen "16B" shown in FIG. 19). Also, in the second embodiment, the symbol value is any one of four values {3, 1, −1, −3}.

In the second embodiment, an FEC binary stream which is 8-bit error correction information is generated in the same manner as the case of the first embodiment based on the 240-bit binary stream for the FEC operation obtained by the conversion.

Next, with reference to FIGS. 29 to 31, as 8B6Q conversion performed in the second embodiment, the 8B6Q conversion will be described in which the 8-bit FEC binary stream is converted into an FEC symbol stream formed by six symbol values.

In the 8B6Q conversion, conversion tables to be used are determined according to the higher 1 bit b7 among the 8 bits b0 to b7 forming the FEC binary stream which is to be converted.

FIG. 29 shows an example of a conversion table used for the 8B6Q conversion in the second embodiment when the higher 1 bit b7 is 0.

In the conversion table shown in FIG. 29, in the left column, 3-bit binary streams are shown, and, in the right column, symbol streams formed by three symbol values obtained by the conversion of the 3-bit binary streams are shown. This is the same as in FIG. 30 described later.

In addition, in the conversion table shown in FIG. 29, the additional value obtained by summing three symbol values forming each of the symbol streams shown in the right column becomes 1.

FIG. 30 shows an example of a conversion table used for the 8B6Q conversion in the second embodiment.

In the conversion table shown in FIG. 30, the additional value obtained by summing three symbol values forming each of the symbol streams shown in the right column becomes 3.

Next, details of the 8B6Q conversion performed in the second embodiment will be described with reference to FIG. 31.

Figure 31:
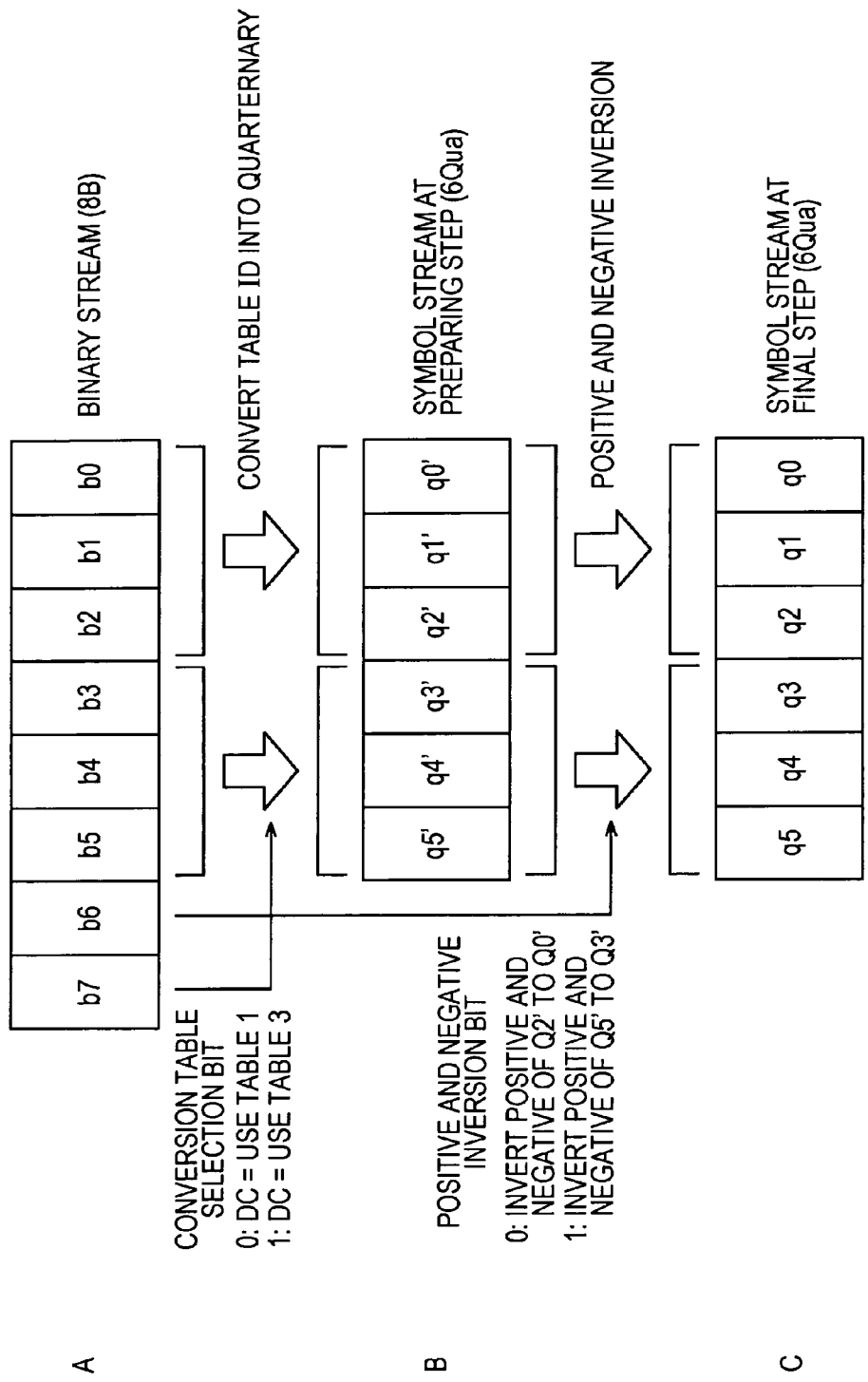
FIG. 31 is a diagram illustrating an example of the 8B6Q conversion.

In A of FIG. 31, an FEC binary stream, which is formed by 8 bits b0 to b7 and is converted by the 8B6Q conversion, is shown.

In B of FIG. 31, a symbol stream, which is obtained by the conversion using the conversion table shown in FIG. 29 or 30 and is formed by six symbol values q0' to q5', is shown.

In C of FIG. 31, an FEC symbol stream, which is obtained as a result of the 8B6Q conversion and is formed by six symbol values q0 to q5, is shown.

In the second embodiment, if the higher 1 bit b7 among the 8 bits b0 to b7 forming the FEC binary stream shown in A of FIG. 31 is 0, the conversion table (FIG. 29) which gives the additional value of 1 is determined as a conversion table used to convert the 6 bits b0 to b5.

Also, if the higher 1 bit b7 among the 8 bits b0 to b7 forming the FEC binary stream shown in A of FIG. 31 is 1, the conversion table (FIG. 30) which gives the additional value of 3 is determined as a conversion table used to convert the 6 bits b0 to b5.

In the second embodiment, using the determined conversion table, the 3 bits b0 to b2 among the 6 bits b0 to b5 shown in A of FIG. 31 are converted into three symbol values q0' to q2' shown in B of FIG. 31.

In addition, using the determined conversion table, the 3 bits b3 to b5 among the 6 bits b0 to b5 shown in A of FIG. 31 are converted into three symbol values q3' to q5' shown in B of FIG. 31.

In the second embodiment, if a value of the 1 bit b6 among the 8 bits b0 to b7 forming the binary stream shown in A of FIG. 31 is 0, the six symbol values q0' to q5' obtained by the conversion are converted into the six symbol values q0 to q5 which are the conversion results of the 8B6Q conversion, as described below.

In other words, if the value of the 1 bit b6 is 0, values obtained by reversing the respective signs of the three symbol values q0' to q2' are set as three symbol values q0 to q2, and the three symbol values q3' to q5' are set as three symbol values q3 to q5 as they are, thereby obtaining the symbol values q0 to q5.

Also, in the second embodiment, if the value of the 1 bit b6 among the 8 bits b0 to b7 forming the binary stream shown in A of FIG. 31 is 1, the six symbol values q0' to q5' obtained by the conversion are converted into the six symbol values q0 to q5 which are the conversion results of the 8B6Q conversion, as described below.

In other words, if the value of the 1 bit b6 is 1, the three symbol values q0' to q2' are set as three symbol values q0 to q2 as they are, and values obtained by reversing the respective signs of the three symbol values q3' to q5' are set as three symbol values q3 to q5, and thereby obtaining the symbol values q0 to q5.

In this way, in the second embodiment, the symbol stream ("6Qua FEC" shown in FIG. 19) formed by the six symbol values q0 to q5 is generated by performing the 8B6Q conversion for the 8-bit error correction information ("8B(FEC)" shown in FIG. 19).

Next, with reference to FIG. 32, details of the 2B2Q conversion performed in the second embodiment will be described in which a 2-bit binary stream corresponding to the low rate data is converted into a symbol stream formed by two symbol values.

Figure 32:
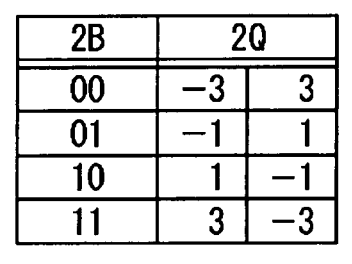

FIG. 32 shows an example of a conversion table used for the 2B2Q conversion.

In the conversion table shown in FIG. 32, in the left column, 2-bit binary streams are shown, and, in the right column, symbol streams formed by two symbol values obtained by the conversion of the 2-bit binary streams are shown.

In addition, in the conversion table shown in FIG. 32, the additional value obtained by summing three symbol values forming each of the symbol streams shown in the right column becomes 0.

In the second embodiment, a 2-bit low rate binary stream ("2B (low rate)" shown in FIG. 19) corresponding to low rate data is converted into a low rate symbol stream ("2Qua" low rate shown in FIG. 19) formed by two symbol values by the 2B2Q conversion.

In addition, in the second embodiment, the low rate symbol stream obtained by the 2B2Q conversion is added to the FEC symbol stream obtained by the 8B6Q conversion, and a new FEC low rate symbol stream ("6Qua FEC+2Qua low rate" shown in FIG. 19) obtained as a result thereof is generated. In the second embodiment, a transmission signal obtained by adding the FEC low rate symbol stream obtained by the 12B8Q conversion to the fifteen high rate symbol streams is transmitted.

In the second embodiment, in the reception side which receives the transmission signal, the inverse conversion is performed in the same manner as in the case described in the first embodiment, and thereby low rate data and high rate data can be obtained.

4. Modified Examples

In the first and second embodiments, for example, the 8-bit error correction information is generated as error correction information for correcting an error occurring in the high rate data corresponding to the fifteen high rate symbol streams, but the present invention is not limited thereto.

In addition, for example, in the first and second embodiments, although the fifteen high rate symbol streams and one FEC low rate symbol stream are transmitted as transmission signals, the number of the high rate symbol streams is not limited thereto, and the number thereof may be other than fifteen.

Also, although the case where the high rate data is converted by the 14B8Q conversion in the first embodiment and the case where the high rate data is converted by the 12B8Q conversion have been described, the conversion methods of converting the high rate data are not limited thereto, and an nBmQ conversion may be employed. Here, n and m denote natural numbers.

In a case of converting the high rate data using the nBmQ conversion, the number of symbol values forming the FEC low rate symbol stream is equal to or less than m.

In this case, the number of symbol streams forming the FEC symbol stream included in the FEC low rate symbol stream is x, and the number of symbol streams forming the low rate symbol stream included in the FEC low rate symbol stream is y. Here, x and y are natural numbers satisfying the condition that (x+y) is equal to or less than m.

Although the notebook type PC 21 has been described in the first and second embodiments, the present invention is also applicable to, for example, a portable telephone or the like in which a main body is connected to a display via a hinge or the like.

The above-described series of processes may be performed by hardware or software. When a series of processes is performed by the software, programs constituting the software are installed from a recording medium to a computer embedding dedicated hardware therein, or, for example, a general personal computer which can execute various kinds of functions by installing various kinds of programs.

Configuration Example of Computer

FIG. 33 shows a configuration example of a personal computer which performs the above-described series of processes by a program.

A CPU (central processing unit) 201 performs various kinds of processes according to a program stored in a ROM (read only memory) 202 or a storage unit 208. The RAM 203 appropriately stores programs or data performed by the CPU 201. The CPU 201, the ROM 202, and the RAM 203 are connected to each other via a bus 204.

The CPU 201 is connected to an input and output interface 205 via the bus 204. The input and output interface 205 is connected to an input unit 206 constituted by a keyboard, a mouse, a microphone or the like, and an output unit 207 constituted by a display, a speaker, and the like. The CPU 201 performs various kinds of processes in response to commands input from the input unit 206. The CPU 201 outputs a processed result to the output unit 207.

The storage unit 208 connected to the input and output interface 205 includes, for example, a hard disk, and stored programs or various kinds of data performed by the CPU 201. A communication unit 209 communicates with external devices via a network such as the Internet or LAN.

A program may be obtained via the communication unit 209 and stored in the storage unit 208.

A drive 210 connected to the input and output interface 205 drives a removable medium 211 such as a magnetic disk, an optical disc or a semiconductor memory, which is installed, and obtains programs or data stored therein. The obtained programs or data is transmitted to and stored in the storage unit 208 as necessary.

Recording media recording programs which can be installed in a computer and be executed by the computer, include, as shown in FIG. 33, the removable media 211 which are package media constituted by magnetic disks (including flexible disks), optical discs (including CD-ROMs (Compact Disc-Read Only Memory) and DVDs (Digital Versatile Disc)), magnetic optical disks (including MD (mini-disc)), or semiconductor memories or the like, or the ROM 202 which stores programs temporarily or permanently, or hard disks constituting the storage unit 208. Programs are optionally recorded in the recording media using a wired or wireless communication medium such as the LAN, the Internet, or digital satellite broadcasting, via the communication unit 209 which is an interface such as a router or a modem.

Also, in this specification, the steps for describing programs recorded in a recording medium include not only processes performed in a time series according to the described order, but also processes performed in parallel or separately even if not necessarily performed in the time series.

It should be understood by those skilled in the art that various modifications, combinations, sub-combinations and alterations may occur depending on design requirements and other factors insofar as they are within the scope of the appended claims or the equivalents thereof.

What is claimed is:

1. A transmission device comprising:
   a first conversion means that converts first transmission target data which is a target of transmission into first transmission data formed by N number of symbol values each of which indicates any one of a plurality of values set in advance, with predetermined units of data, based on a first conversion table stored in advance;
   a second conversion means that converts first error correction data, which is used to correct errors occurring in the first transmission target data, into first symbol data formed by X number of symbol values, based on a second conversion table stored in advance;
   a third conversion means that converts second transmission target data different from the first transmission target data into second symbol data formed by (N-X) number of symbol values, based on a third conversion table stored in advance;
   an addition and generation means that adds the second symbol data to the first symbol data and generates second transmission data formed by the N number of symbol values; and
   a transmission means that transmits a transmission signal formed by the first and second transmission data,
   in which each of N and X represent a positive integer natural number.

2. The transmission device according to claim 1, further comprising a fourth conversion means that converts second error correction data which is used to correct an error occurring in the second transmission target data, into third symbol data formed by the a symbol values, based on a fourth conversion table stored in advance,
   wherein the addition and generation means adds predetermined symbol data to the third symbol data and generates third transmission data formed by the N number of symbol values, and
   wherein the transmission means transmits the transmission signal formed by the first to third transmission data.

3. The transmission device according to claim 1 or 2, wherein the transmission means superposes the transmission signal on a current as a power and transmits the superposed transmission signal.

4. The transmission device according to claim 3, further comprising:
   a separation means that separates the transmission signal transmitted by the transmission means from the current;
   a first inverse conversion means that converts the first transmission data included in the transmission signal into the first transmission target data based on a conversion table, stored in advance, which is the same as the first conversion table;
   an extraction means that extracts the first symbol data and the second symbol data from the second transmission data included in the transmission signal;

a second inverse conversion means that converts the first symbol data into the first error correction data based on a conversion table, stored in advance, which is the same as the second conversion table;

an error correction means that corrects an error occurring in the first transmission target data based on the first error correction data;

a third inverse conversion means that converts the second symbol data into the second transmission target data based on a conversion table, stored in advance, which is the same as the third conversion table; and a processing means that performs a predetermined process based on the first transmission target data after the error is corrected and the second transmission target data.

5. The transmission device according to claim 3, wherein each of the first and second transmission data is formed by symbol values of which a sum total becomes 0, and wherein the transmission means superposes a transmission signal formed by symbol values of which a sum total becomes 0, on the current and transmits the superposed transmission signal.

6. The transmission device according to claim 1, further comprising:

a fourth conversion means that converts the first transmission data corresponding to the first transmission target data into data for generation used to generate the first error correction data; and an error correction data generation means which generates the first error correction data based on the data for generation.

7. A transmission method in a transmission device transmitting a transmission signal and including a first conversion means, a second conversion means, a third conversion means, an addition and generation means, and a transmission means, the method comprising the steps of:

causing the first conversion means to convert first transmission target data which is a target of transmission into first transmission data formed by N number of symbol values each of which indicates any one of a plurality of values set in advance, with predetermined units of data, based on a first conversion table stored in advance;

causing the second conversion means to convert first error correction data, which is used to correct an error occurring in the first transmission target data, into first symbol data formed by X number of symbol values, based on a second conversion table stored in advance;

causing the third conversion means to convert second transmission target data different from the first transmission target data into second symbol data formed by (N-X) number of symbol values, based on a third conversion table stored in advance;

causing the addition and generation means that adds the second symbol data to the first symbol data to generate second transmission data formed by the N number of symbol values; and causing the transmission means to transmit a transmission signal formed by the first and second transmission data, in which each of N and X represent a positive integer natural number.

8. A non-transitory computer readable memory having stored thereon a program enabling a computer to function as:

a first conversion means that converts first transmission target data which is a target of transmission into first transmission data formed by N number of symbol values each of which indicates any one of a plurality of values set in advance, with predetermined units of data, based on a first conversion table stored in advance;

a second conversion means that converts first error correction data, which is used to correct an error occurring in the first transmission target data, into first symbol data formed by X number of symbol values, based on a second conversion table stored in advance;

a third conversion means that converts second transmission target data different from the first transmission target data into second symbol data formed by (N-X) number of symbol values, based on a third conversion table stored in advance;

an addition and generation means that adds the second symbol data to the first symbol data and generates second transmission data formed by the N number of symbol values; and a transmission means that transmits a transmission signal formed by the first and second transmission data, in which each of N and X represent a positive integer natural number.

9. A transmission device comprising:

a first conversion unit that converts first transmission target data which is a target of transmission into first transmission data formed by N number of symbol values each of which indicates any one of a plurality of values set in advance, with predetermined units of data, based on a first conversion table stored in advance;

a second conversion unit that converts first error correction data, which is used to correct an error occurring in the first transmission target data, into first symbol data formed by X number of symbol values, based on a second conversion table stored in advance;

a third conversion unit that converts second transmission target data different from the first transmission target data into second symbol data formed by (N-X) number of symbol values, based on a third conversion table stored in advance;

an addition and generation unit that adds the second symbol data to the first symbol data and generates second transmission data formed by the N number of symbol values; and a transmission unit that transmits a transmission signal formed by the first and second transmission data, in which each of N and X represent a positive integer natural number.

* * * * *